United States Patent
Komori et al.

(10) Patent No.: US 7,623,756 B2
(45) Date of Patent: Nov. 24, 2009

(54) APPARATUS, METHOD, AND COMPUTER PROGRAM FOR PROCESSING INFORMATION

(75) Inventors: Yoko Komori, Kanagawa (JP); Tomoyuki Hanai, Kanagawa (JP)

(73) Assignee: Sony Corporation (JP)

( * ) Notice: Subject to any disclaimer, the term of this patent is extended or adjusted under 35 U.S.C. 154(b) by 889 days.

(21) Appl. No.: 11/202,565

(22) Filed: Aug. 12, 2005

(65) Prior Publication Data

US 2006/0044955 A1    Mar. 2, 2006

(30) Foreign Application Priority Data

Aug. 13, 2004    (JP)    ............ P2004-235922

(51) Int. Cl.
*H04N 5/91* (2006.01)
*H04N 5/93* (2006.01)
*G11B 27/00* (2006.01)

(52) U.S. Cl. ............ 386/68; 386/52; 386/55; 386/95

(58) Field of Classification Search .......... 386/52, 386/55, 68, 95
See application file for complete search history.

(56) References Cited

U.S. PATENT DOCUMENTS 6,144,799 A * 11/2000 Ohnami .......... 386/68
6,571,052 B1 * 5/2003 Wakimoto et al. .......... 386/55
2003/0002853 A1    1/2003 Hori et al.
2003/0152363 A1    8/2003 Jeannin et al.
2003/0194210 A1    10/2003 Shiiyama

FOREIGN PATENT DOCUMENTS

| EP | 0 689 355 A2 | 12/1995 |
|---|---|---|
| EP | 1 182 584 A2 | 2/2002 |
| JP | 09-093525 A | 4/1997 |
| JP | 11-088874 A | 3/1999 |
| JP | 2000-149509 A | 5/2000 |
| JP | 2001-060381 B2 | 3/2001 |
| JP | 2002-016858 A1 | 1/2002 |
| JP | 2003-299000 A | 10/2003 |

* cited by examiner

*Primary Examiner*—Thai Tran
*Assistant Examiner*—Daquan Zhao
(74) *Attorney, Agent, or Firm*—Lerner, David, Littenberg, Krumholz & Mentlik, LLP

(57) ABSTRACT

An information processing apparatus includes an acquisition unit operable to acquire first information to be played back, and second information relating to a breakpoint candidate of the first information; a display control unit operable to control the playback of the first information; and a display speed control unit operable to control a playback speed of the first information based on the second information. The display speed control unit controls the playback speed of the first information based on the second information so that the first information is played back at a relatively low speed within a predetermined period of the first information in the vicinity of the breakpoint candidate and is played back at a relatively high speed within a remaining period of the first information.

18 Claims, 23 Drawing Sheets

```
2004_03_22_13000802.pgm      // ORIGINAL PROGRAM FILE NAME
00:00:10      // LOW-SPEED PLAYBACK START TIME CODE
00:00:20      // BREAKPOINT POSITION TIME CODE
00:00:30      // LOW-SPEED PLAYBACK END TIME CODE
   :
   :
   .
```

FIG. 7
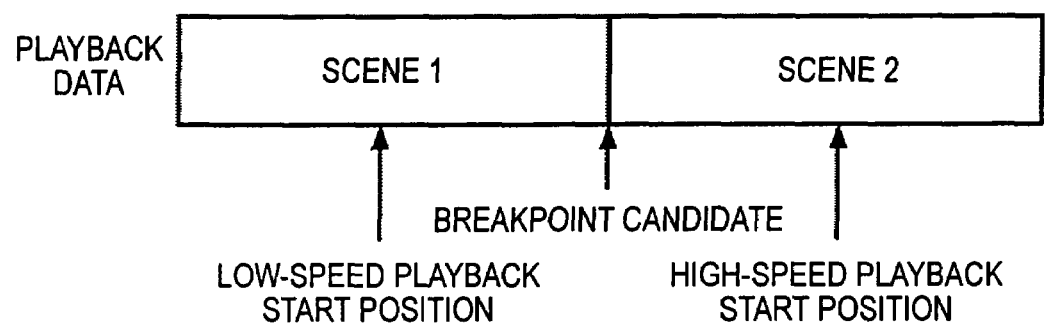
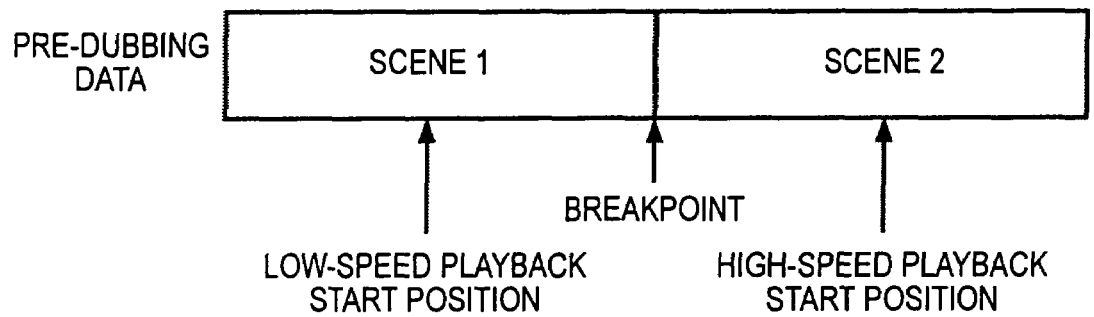

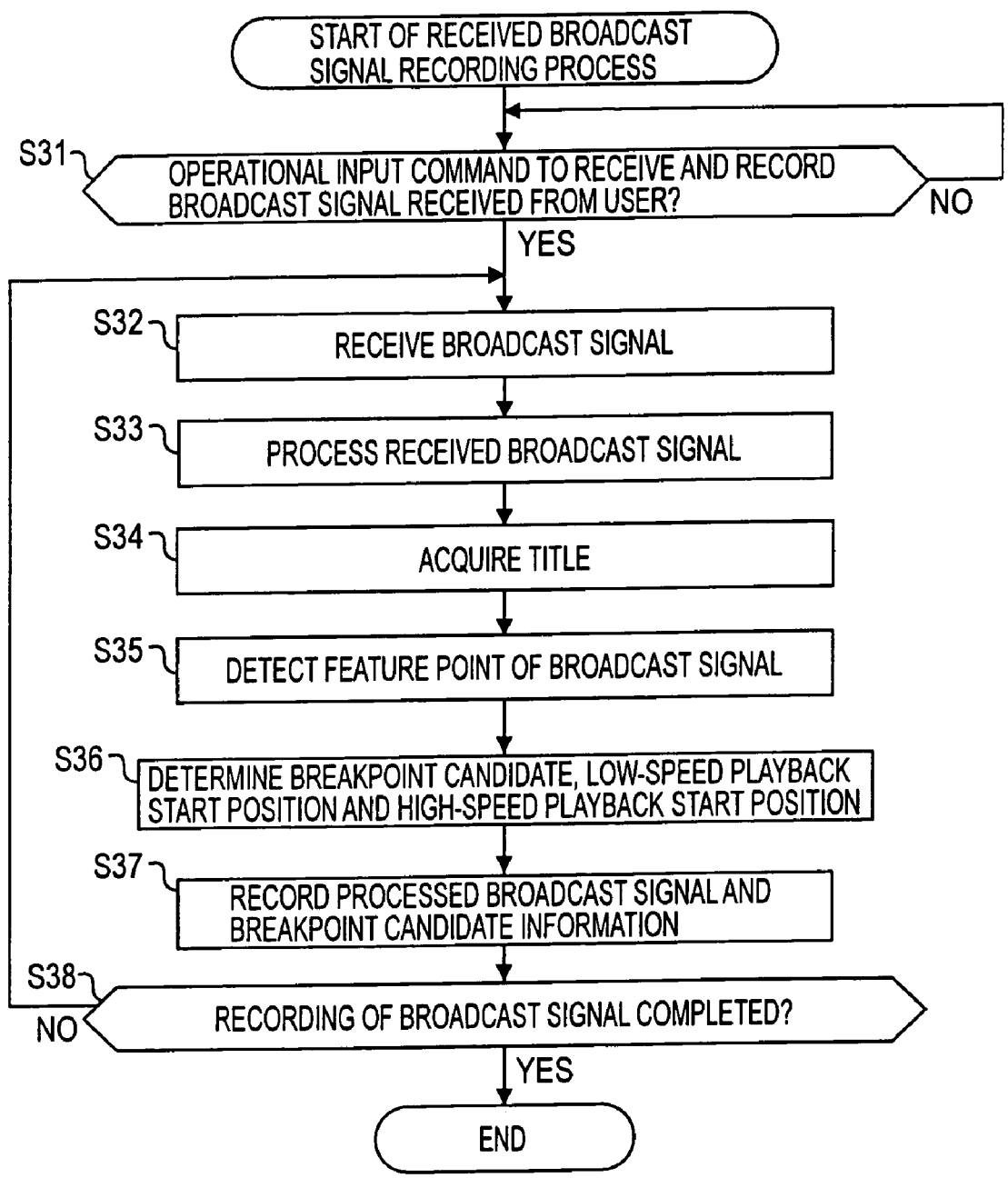

APPARATUS, METHOD, AND COMPUTER PROGRAM FOR PROCESSING INFORMATION

CROSS-REFERENCE TO RELATED APPLICATIONS

The present application claims priority from Japanese Patent Application No. JP 2004-235922 filed on Aug. 13, 2004, the disclosure of which is hereby incorporated by reference herein.

BACKGROUND OF THE INVENTION

The present invention relates to an information processing apparatus, an information processing method, and a computer program for processing information and, in particular, to an information processing apparatus, an information processing method, and a computer program appropriate for performing an editing process.

Known recording and playback apparatuses include one of a hard disk drive (HDD) and a digital versatile disk (DVD) drive to record content data to and play back content data from one of a hard disk (HD) and a DVD. The recording and playback apparatus records, onto a HD, one of television broadcast data and input data input from the outside. A portion of the data recorded on the hard disk, desired by a user, can be recorded onto a DVD (dubbed onto a DVD) for storage purpose. The user typically extracts a desired scene from the recorded data to be dubbed onto the DVD. To satisfy such a user requirement, the recording and playback apparatus is designed to allow only a desired scene to be extracted from the data recorded on the HD in response to an operational input from a user. Edited and generated data is then dubbed onto the DVD.

The edited data is not only dubbed onto the DVD but also stored onto a different recording area of the HD.

If the data is broadcast program data, a data title can be attached to each program data. If the data is the one picked up by a camcorder, a data title can be attached to each data input to a recording and playback apparatus. In the case of a DVD camcorder, a data title can be attached on a per DVD disk basis. The user searches a plurality of recorded data units for desired data with a title as a search key.

Widely used editing methods include a chapter method and an in and output point method. In the chapter method, data is divided into small units referred to as chapters for editing. In the in and out method, the user clips a scene of the data with a start point (in point) and an end point (out point) determined. Scene change where picture largely changes is detected as a breakpoint of the chapter or the scene. In the scene change detection method, a difference in moving image frames between a prior frame and a subsequent frame is calculated, and the variance of the differences of a predetermined number of consecutive frames is calculated. Using the calculated variance, a deviation of the differences of the frames contained in the predetermined number of frames is calculated to detect a scene change. Such a technique is disclosed in Japanese Unexamined Patent Application Publication No. 2003-299000.

Japanese Patent No. 3502579 corresponding to Japanese Unexamined Patent Application Publication No. 2001-60381 discloses another technique. According to the disclosure, the user plays back a content to specify a copy position of the content recorded on a primary recording medium as editing points, such as a chapter breakpoint and in and out points. When the playback operation reaches one of a desired start point and a desired end point of a chapter, the user indicates one of a start point and an end point using a display.

Known methods of specifying the editing points are described below with reference to FIGS. 1 and 2.

FIG. 1 is a block diagram illustrating a known recording and playback apparatus 1.

A central processing unit (CPU) 11 generally controls the recording and playback apparatus 1. In response to an operational input entered via an operation input unit 12 by a user, the CPU 11 reads a predetermined application program from a read-only memory (ROM) 13, and then loads the application program to a random-access memory (RAM) 14. A flash ROM 15 stores information, which needs to be continuously stored even when power is removed, out of information required by the CPU 11 in operation.

An antenna 16 receives broadcast signals and supplies the received signals to a tuner 17. The tuner 17 selects one broadcast signal on a channel desired by the user, and supplies the selected broadcast program data to a switch 19. An input terminal 18 receives broadcast program data, such as cable television broadcast data, and supplies the received data to the switch 19. The switch 19 supplies, to an NTSC (National TV Standard Committee) decoder 20, one of the broadcast program data selected by the tuner 17 and the broadcast program data input via the input terminal 18. An electronic program guide (EPG) can also be supplied to the input terminal 18. The supplied EPG data is then transferred to the CPU 11 via the switch 19, the NTSC decoder 20, and an MPEG encoder 21 (data processing is performed when necessary). The EPG data can be used to schedule recording of broadcast program data.

The NTSC decoder 20 decodes the supplied signal using the NTSC system, and supplies the decoded data to the MPEG encoder 21. The MPEG encoder 21 performs an encoding process in accordance with one of MPEG standards (MPEG2, MPEG4, etc.), and then supplies encoded (compressed) data to a drive controller 22 to record the data onto one of a hard disk of a HDD 23 and a DVD loaded on a DVD drive 24.

The drive controller 22 under the control of the CPU 11 supplies the received signal to one of the HDD 23 and the DVD drive 24 to record one of the hard disk and the DVD. The drive controller 22 also drives one of the HDD 23 and the DVD drive 24 to read data desired by the user from one of the hard disk and the DVD.

The HDD 23 drives the hard disk to record onto the hard disk the data supplied from the drive controller 22, and read data from the hard disk and supply the read data to the drive controller 22.

The DVD drive 24 drives the DVD loaded thereon to record onto the DVD the data supplied from the drive controller 22, and read data from the DVD and supply the read data to the drive controller 22.

The MPEG decoder 25 receives playback data from the drive controller 22, and decodes the received data in accordance with one of the MPEG standards (MPEG2, MPEG4, etc.), and then supplies a resulting video signal to a video signal processor 26 and a resulting audio signal to a audio signal processor 28.

Upon receiving the video data decoded by the MPEG decoder 25, the video signal processor 26 converts the video data into a NTSC format signal or digital-to-analog converts the video data, and supplies a display controller 27 with the converted data. The display controller 27, under the control of the CPU 11, controls the displaying of the supplied video data to be displayed on one of a television receiver and an external monitor.

Upon receiving the audio data decoded by the MPEG decoder 25, the audio signal processor 28 performs predetermined processes, including noise removal, amplification, and digital-to-analog conversion, onto the audio data, and outputs a resulting audio signal to the audio output controller 29. The audio output controller 29, under the control of the CPU 11, controls the outputting of the audio signal in one of the television receiver and an external loudspeaker device.

A known breakpoint determination and dubbing process of the recording and playback apparatus 1 discussed with reference to FIG. 1 is described below with reference to a flowchart of FIG. 2.

In step S1, the CPU 11 determines in response to the signal supplied from the operation input unit 12 whether a dubbing start command has been received from the user. If it is determined in step S1 that no dubbing start command has been received, the process in step S1 is repeated until it is determined that a dubbing start command has been received.

If it is determined in step S1 that a dubbing start signal has been received from the user, the CPU 11 controls the drive controller 22 in step S2 to read, from one of the HDD 23 and the DVD drive 24, a content (data of an original program) to be dubbed, and supplies the read content to the MPEG decoder 25. The MPEG decoder 25 decodes the supplied data, and then supplies the video data to the video signal processor 26 and the audio data to the audio signal processor 28. The video signal processor 26 performs predetermined processes on the decoded video data, and then supplies the processed data to the display controller 27. The audio signal processor 28 performs predetermined processes on the decoded audio data, and then supplies the processed data to the audio output controller 29.

The CPU 11 determines in step S3 in response to the signal supplied from the operation input unit 12 whether a high-speed playback (in one of a forward direction and a reverse direction) has been received from the user.

If it is determined in step S3 that a high-speed playback command has been received, the CPU 11 controls the display controller 27 and the audio output controller 29, thereby starting a high-speed playback operation in step S4.

If it is determined in step S3 that no high-speed playback command has been received from the user, the CPU 11 determines in step S5 in response to a signal supplied from the operation input unit 12 whether a frame playback command (in one of a forward direction and a reverse direction) has been received from the user.

If it is determined in step S5 that a frame playback command has been received from the user, the CPU 51 controls the display controller 27 and the audio output controller 29 in step S6, thereby starting the frame playback.

If it is determined in step S5 that no frame playback command has been received from the user, or subsequent to step S6, the CPU 11 determines in step S7 in response to a signal supplied from the operation input unit 12 whether a standard-speed playback command (in one of a forward direction and a reverse direction) has been received from the user.

If it is determined in step S7 that a standard-speed playback command has been received from the user, the CPU 11 controls the display controller 27 and the audio output controller 29 in step S8, thereby performing a playback operation at a standard speed.

If it is determined in step S7 that no standard-speed playback command has been received from the user, or subsequent to step S8, the CPU 11 determines in step S9 in response to a signal supplied from the operation input unit 12 whether an operational input specifying a breakpoint has been received from the user.

If it is determined in step S9 that an operational input specifying a breakpoint has been received from the user, the CPU 11 stores information concerning the breakpoint onto the RAM 14 in step S10.

If it is determined in step S9 that no operational input specifying the breakpoint has been received from the user, or subsequent to step S10, the CPU 11 determines in step S11 whether a content to be dubbed has been played back to the end thereof. If it is determined in step S11 that the content has not been played back to the end thereof, processing returns to step S3 to repeat step S3 and subsequent steps.

If it is determined in step S11 that the content to be dubbed has been played back to the end thereof, the CPU 11 performs in step S12 a dubbing process based on information concerning the breakpoint recorded on the RAM 14. More specifically, a content recorded on one of the hard disk in the HDD 23 and the DVD loaded in the HDD 23 is partitioned based on the information relating to the breakpoint recorded on the RAM 14. Only a portion of the content desired by the user is recorded on a different recording area of one of the hard disk in the HDD 23 and the DVD loaded on the DVD drive 24. The dubbing process is thus completed.

The user plays back at a desired speed the content to be dubbed or rewinds the content. The user thus determines the breakpoint (namely, in and out points and a chapter breakpoint) to partition the content recorded on the hard disk in the HDD 23 into a portion desired to be dubbed and a portion not to be dubbed.

In each of the chapter method and the in and output point method, the user looks for the edit breakpoint while playing back the content. More specifically, in the editing operation to search for the breakpoint, the user plays back the content at a high speed where a breakpoint is unlikely to present. While monitoring the video, the user reduces the playback speed, performs a frame playback operation, or suspends the playback operation as the playback position becomes close to a breakpoint. The user thus checks a location of the breakpoint, and may rewind the content slightly after passing the breakpoint for confirmation. The breakpoint is verified in this way. In the known editing operation, operational inputs become complex, and the user can miss the timing of modifying the playback speed. The point to be set as a breakpoint can be passed at a high speed, and an unnecessary portion can be dubbed.

To facilitate the editing process, a scene change is detected to be used as a breakpoint. The detected position of the scene change point does not always match the breakpoint desired by the user. The user thus needs to enter complex operational inputs to play back the content in the vicinity of a scene change detected point of the content to be dubbed. The user needs to verify and modify the breakpoint as necessary.

In the chapter method, a breakpoint is likely to be present near a front of a chapter to be specified as a range of dubbing. When the front section is played back, the user slows the playback speed or performs a frame playback. The user enters an operational input to rewind the content slightly as necessary after the playback of the breakpoint (namely, after verifying the breakpoint), and then fixes the breakpoint. More specifically, in the editing process to search for a breakpoint based on the chapter, the user starts playing back from the front of the chapter to be dubbed, returns to a preceding chapter to determined whether the breakpoint is correct, and then continuously plays back to the selected chapter. If the user desires to modify the breakpoint, the content is rewound to the location of the desired point. While performing the frame playback, the user checks the modified breakpoint and then sets the breakpoint. If the user enters the operational inputs to play back the content in the vicinity of the breakpoint in the chapter method, the operational inputs become complex. It is likely that the user overlooks another breakpoint in an area other than the font section of the chapter.

If the data is broadcast program data, a data title can be attached to each program data. If the data is data picked up by a camcorder, a data title can be attached to each data input to a recording and playback apparatus. In the case of a DVD camcorder, a data title can be attached on a per DVD disk basis. If the user desires to attach a plurality of titles to each scene, the content needs to be partitioned into data units.

For example, in the data recorded on a DVD on a DVD camcorder, data code such as date of photographing, photographing actions, and camera settings is recorded together with video. In the process as previously discussed with reference to FIG. 2, a DVD having the video recorded thereon with the DVD camcorder is loaded onto the DVD drive 24 to record the content onto the hard disk in the DVD drive 24. The date of photographing and the photographing actions (including a video capturing recording position) may serve as a search key. These parameters and newly set breakpoints can be specified as a playback start point, but cannot be individually annotated with titles.

It is thus desirable to simplify an editing process by reducing user operational input time with a breakpoint candidate predetermined in a manner such that a playback speed in the vicinity of the breakpoint candidate is automatically slowed.

SUMMARY OF THE INVENTION

In accordance with one embodiment of the present invention, an information processing apparatus includes an acquisition unit operable to acquire first information to be played back, and second information relating to a breakpoint candidate of the first information; a display control unit operable to control the playback of the first information; and a display speed control unit operable to control a playback speed of the first information. The display speed control unit controls the playback speed of the first information based on the second information so that the first information is played back at a relatively low speed within a predetermined period of the first information in the vicinity of the breakpoint candidate and is played back at a relatively high speed within a remaining period of the first information.

Preferably, the first information includes at least moving image data, and the second information relates to the breakpoint candidate set in response to the detection of a scene change in the moving image data.

Preferably, the information processing apparatus further includes an operation input unit for receiving an operational input entered by a user, wherein the display speed control unit controls the playback speed of the first information in response to the operational input entered by the user.

Preferably, the information processing apparatus further includes a storage unit for storing the second information acquired by the acquisition unit; an operational input unit for receiving an operational input entered by a user; an update control unit for controlling the updating of the second information stored in the storage unit to form updated second information based on the operational input for setting the breakpoint if the operational input for setting the breakpoint is entered via the operational input unit; and a record control unit for controlling the recording of third information produced by editing the first information based on the updated second information.

Preferably, the information processing apparatus further includes a generating unit for generating fourth information by binding first text data entered via the operational input unit to information of the breakpoint of the updated second information.

Preferably, the information processing apparatus further includes a playback control unit for controlling a playback start position of the first information based on time information corresponding to the first text data that is extracted from the fourth information matching second text data entered via the operational input unit by the user, wherein the time information of the breakpoint is bound to the fourth information in addition to the first text data and the information of the breakpoint.

Preferably, the generating unit sorts the first text data contained in the fourth information into a plurality of groups in response to an operational input entered via the operational input unit by the user. The display control unit controls the displaying of a list of the first text data contained in a predetermined one of the plurality of groups selected by the user; and the playback control unit controls the playback start position of the first information based on the time information corresponding to the first text data selected by the user as a result of the user's referencing the displayed list of the first text data.

Preferably, the display control unit further controls the displaying of a list of information of a plurality of first text data if the plurality of first text data contained in the fourth information matching the second text data entered via the operational input unit by the user are extracted. The playback control unit controls the playback start position of the first information based on the time information corresponding to the first text data selected by the user as a result of the user's referencing the displayed list of the first text data.

In accordance with another embodiment of the present invention, a method for controlling the playback of information includes acquiring first information to be played back, and second information relating to a breakpoint candidate of the first information; and controlling a playback speed of the first information, wherein the step of controlling the playback speed includes controlling the playback of the first information based on the second information so that the first information is played back at a relatively low speed within a predetermined period of the first information in the vicinity of the breakpoint candidate and is played back at a relatively high speed within a remaining period of the first information.

In accordance with yet another embodiment of the present invention, a recording medium is recorded with a computer program for causing a computer to execute a method of controlling the playback of information. The method includes acquiring first information to be played back, and second information relating to a breakpoint candidate of the first information; and controlling a playback speed of the first information, wherein the step of controlling the playback speed includes controlling the playback of the first information based on the second information so that the first information is played back at a relatively low speed within a predetermined period of the first information in the vicinity of the breakpoint candidate and is played back at a relatively high speed within a remaining period of the first information.

In the information processing apparatus, the information processing method, and the computer program in accordance with embodiments of the present invention, the first information to be played back, and the second information relating to the breakpoint candidate of the first information are acquired. Based on the acquired second information, the first information is played back at the relatively low speed within the predetermined period of the first information in the vicinity of the breakpoint candidate, and is played back at the relatively high speed within the remaining period of the first information.

In accordance with a further embodiment of the present invention, an information processing apparatus includes an acquisition unit for acquiring first information to be recorded; a determining unit for determining a breakpoint candidate of the first information; a generating unit for generating second information containing information relating to the breakpoint candidate determined by the determining unit; and a recording unit for recording the first information and the second information with the first information and the second information bound to each other.

Preferably, the first information includes at least moving image data, and the determining unit determines the breakpoint candidate by detecting a scene change of the moving image data.

Preferably, the information processing apparatus further includes a display control unit for controlling the playback of the recorded first information; and a display speed control unit for controlling a playback speed of the first information, wherein the display speed control unit controls the playback speed of the first information based on the second information so that the first information is played back at a relatively low speed within a predetermined period of the first information in the vicinity of the breakpoint candidate and is played back at a relatively high speed within a remaining period of the first information.

In accordance with a further embodiment of the present invention, a method for controlling the recording of information includes acquiring first information to be recorded; detecting information corresponding to a breakpoint candidate of the first information; generating second information based on the information corresponding to the breakpoint candidate; and controlling the recording of the first information and the second information so that the first information and the second information are bound to each other.

In accordance with a further embodiment of the present invention, a recording medium is recorded with a computer program for causing a computer to execute a method of controlling the recording of information. The method includes acquiring first information to be recorded; detecting information corresponding to a breakpoint candidate of the first information; generating second information based on the information corresponding to the breakpoint candidate; and controlling the recording of the first information and the second information so that the first information and the second information are bound to each other.

In the information processing apparatus, the information processing method, and the computer program in accordance with these embodiments of the present invention, the first information to be recorded is acquired. Based on the acquired first information, information corresponding to a breakpoint candidate of the first information is detected. The second information is generated based on the information corresponding to the detected breakpoint candidate. The first information and the second information are recorded so that they are bound to each other.

In accordance with embodiments of the present invention, the first information is played back at the relatively low speed in the period of the first information in the vicinity of the breakpoint candidate in response to the second information concerning the breakpoint. The first information is played back at the relatively high speed in the remaining period thereof. The editing process thus becomes easy.

In accordance with embodiments of the present invention, the breakpoint candidate is determined from the first information to be recorded. The second information containing the information concerning the breakpoint candidate is recorded together with the first information. When the first information is played back in the editing process, the playback speed is controlled based on the second information.

BRIEF DESCRIPTION OF THE DRAWINGS

FIG. 7 illustrates the playback operation for editing;

FIG. 13 is a flowchart illustrating a broadcast signal receiving process;

DETAILED DESCRIPTION

Figure 1:
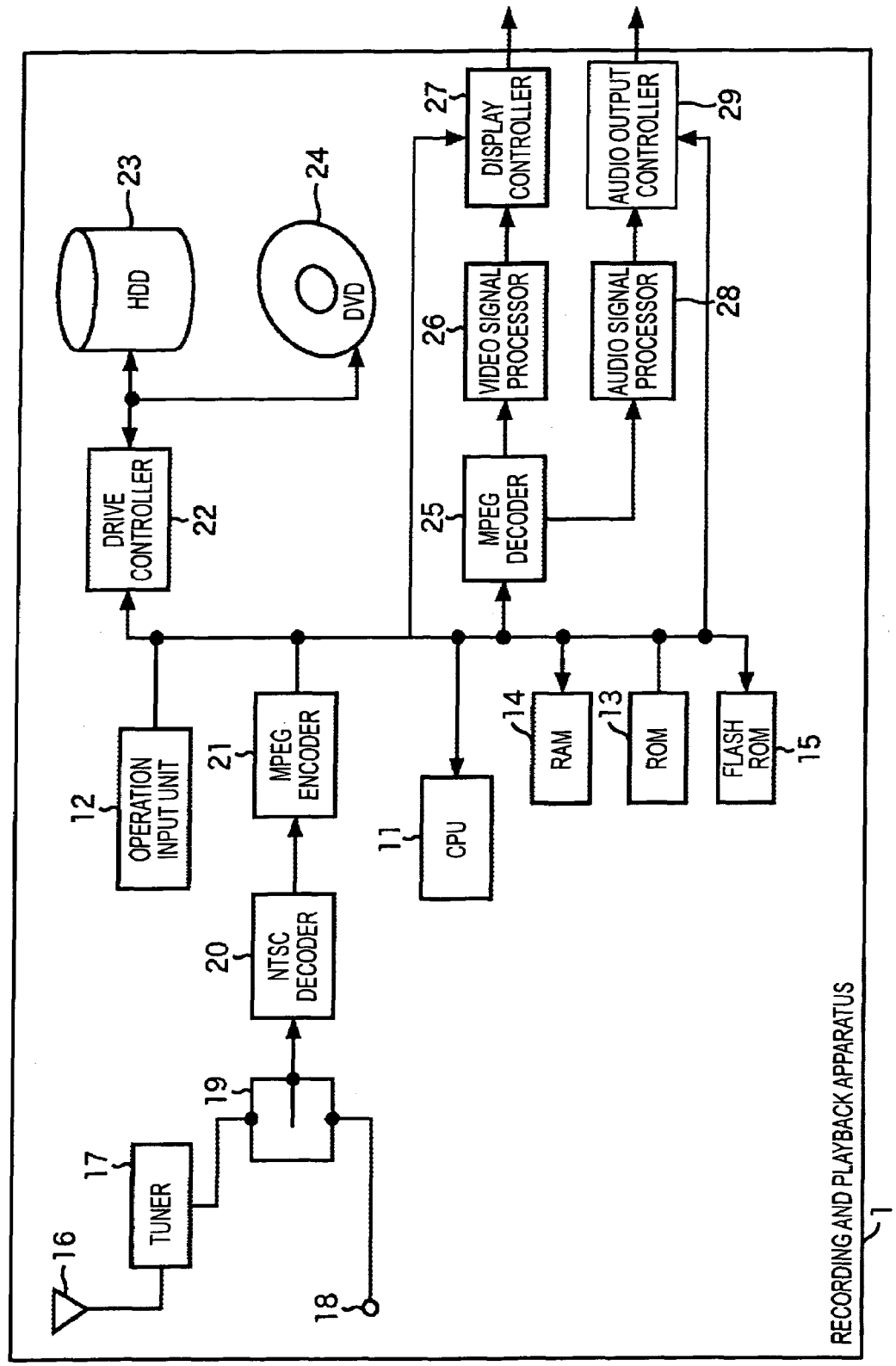
FIG. 1 is a block diagram of a known recording and playback apparatus.
Figure 2:
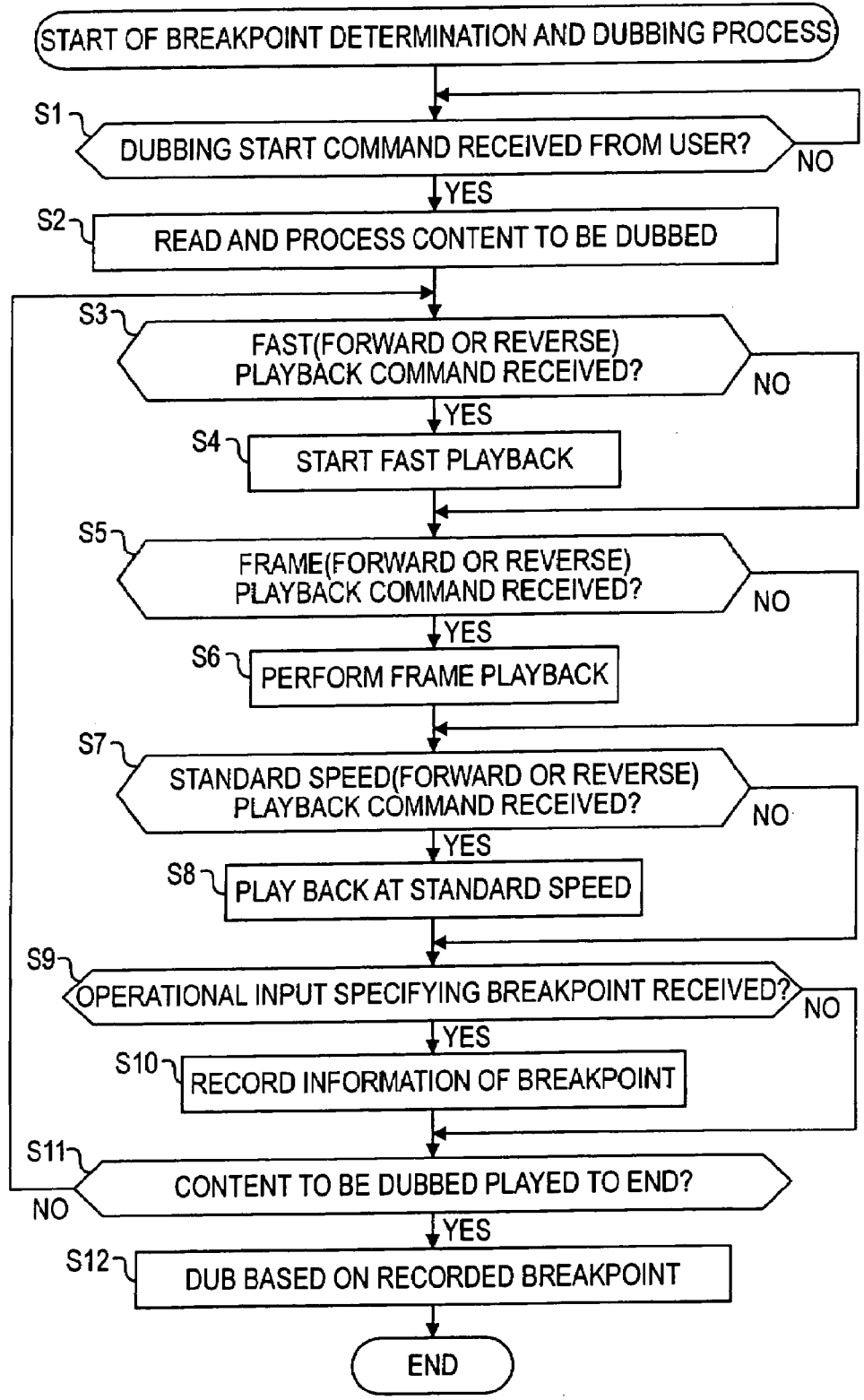
FIG. 2 is a flowchart illustrating a known breakpoint determination and dubbing process.

Before describing an embodiment of the present invention, the correspondence between the features of the claims and the specific elements disclosed in an embodiment of the present invention is discussed below. This description is intended to assure that specific elements disclosed in an embodiment supporting the claimed invention are described in this specification. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in an embodiment are described in the claims. That is, the description does not deny the existence of aspects of the present invention that are described in an embodiment but not claimed in the invention of this application, i.e., the existence of aspects of the present invention that in future may be claimed by a divisional application, or that may be additionally claimed through amendments.

An information processing apparatus of one embodiment of the present invention (for example, an information processing apparatus of FIG. 3) includes an acquisition unit (for example, a drive controller 22 of FIG. 3) for acquiring first information to be played back, and second information relating to a breakpoint candidate of the first information, a display control unit (for example, a display controller 53 of FIG. 3) for controlling the displaying of the first information acquired by the acquisition unit, and a display speed control unit (for example, a CPU 51 of FIG. 3 performing steps S53 through S59 of FIG. 15 and steps S66 and S67 of FIG. 16) for controlling a display speed of the first information, displayed under the control of the display control unit, in response to the second information acquired by the acquisition unit. The display speed control unit controls the display speed of the first information in response to the second information so that the first information is displayed at a low speed within a predetermined period in the vicinity of the breakpoint candidate and at a high speed on the remaining period of the first information.

The information processing apparatus further includes an operation input unit (for example, an operation input unit 12 of FIG. 3) for receiving an operational input entered by a user, wherein the display speed control unit controls the display speed of the first information in response to the operational input entered by the user via the operation input unit.

The information processing apparatus further includes a storage unit (for example, a RAM 14 of FIG. 3) for storing the second information acquired by the acquisition unit, an operational input unit (for example, the operation input unit 12 of FIG. 3) for receiving an operational input entered by a user, an update control unit (the CPU 51 of FIG. 3 performing steps S60 through S65 of FIG. 16) for controlling the updating of the second information, stored in the storage unit, in response to the operational input for breakpoint setting if the operational input for the breakpoint setting is entered via the operational input unit, and a record control unit (for example, the CPU 51 of FIG. 3 performing step S74 of FIG. 17) for controlling the recording of third information, the third information produced by editing the first information based on the second information that is updated under the control of the update control unit.

The information processing apparatus further includes a generating unit (for example, the CPU 51 of FIG. 3 performing step S73 of FIG. 17) for generating fourth information (a title list to be discussed with reference to FIGS. 18 and 19) by binding first text data (for example, a title name) entered via the operational input unit to information of the breakpoint of the second information that is updated under the control of the update control unit.

Figure 23:
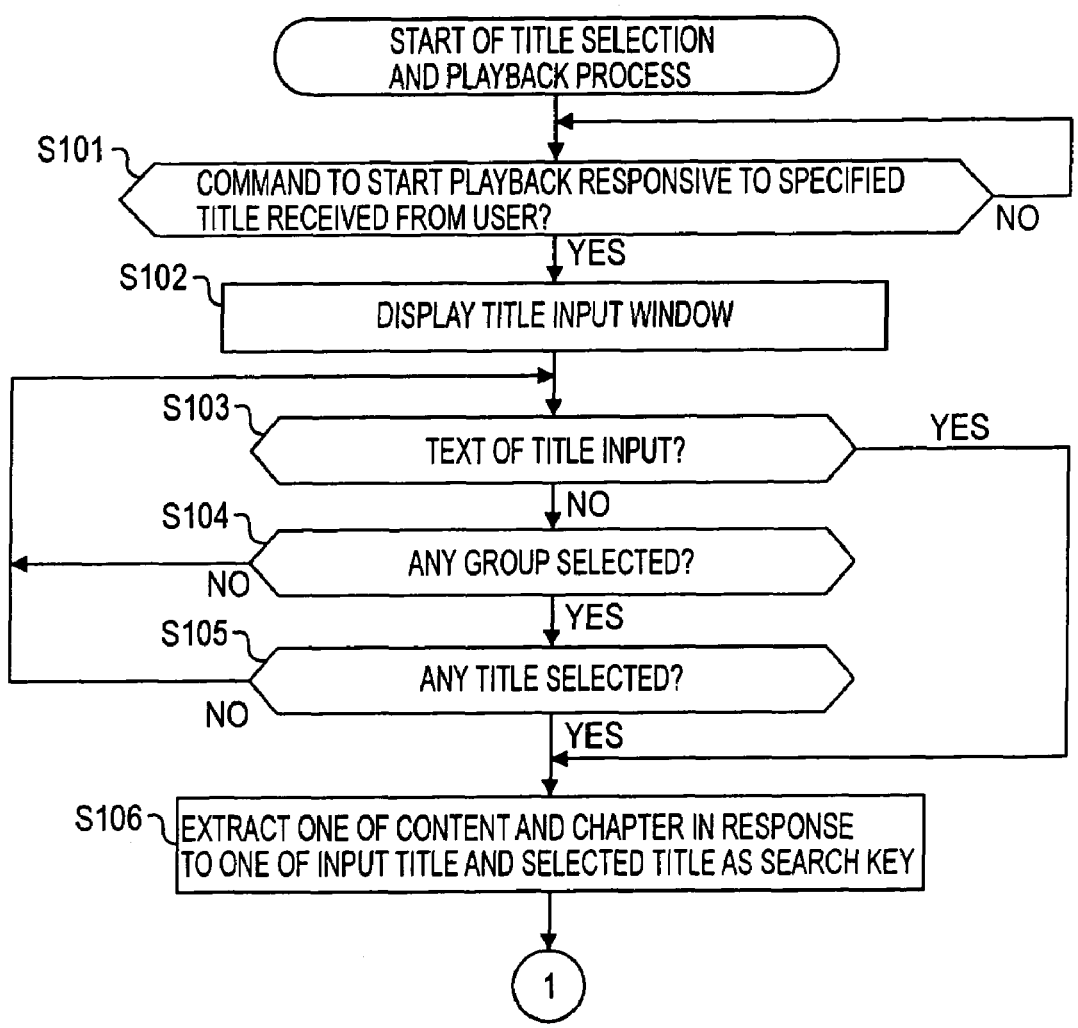
FIG. 23 is a flowchart illustrating a title selection and playback process.
Figure 24:
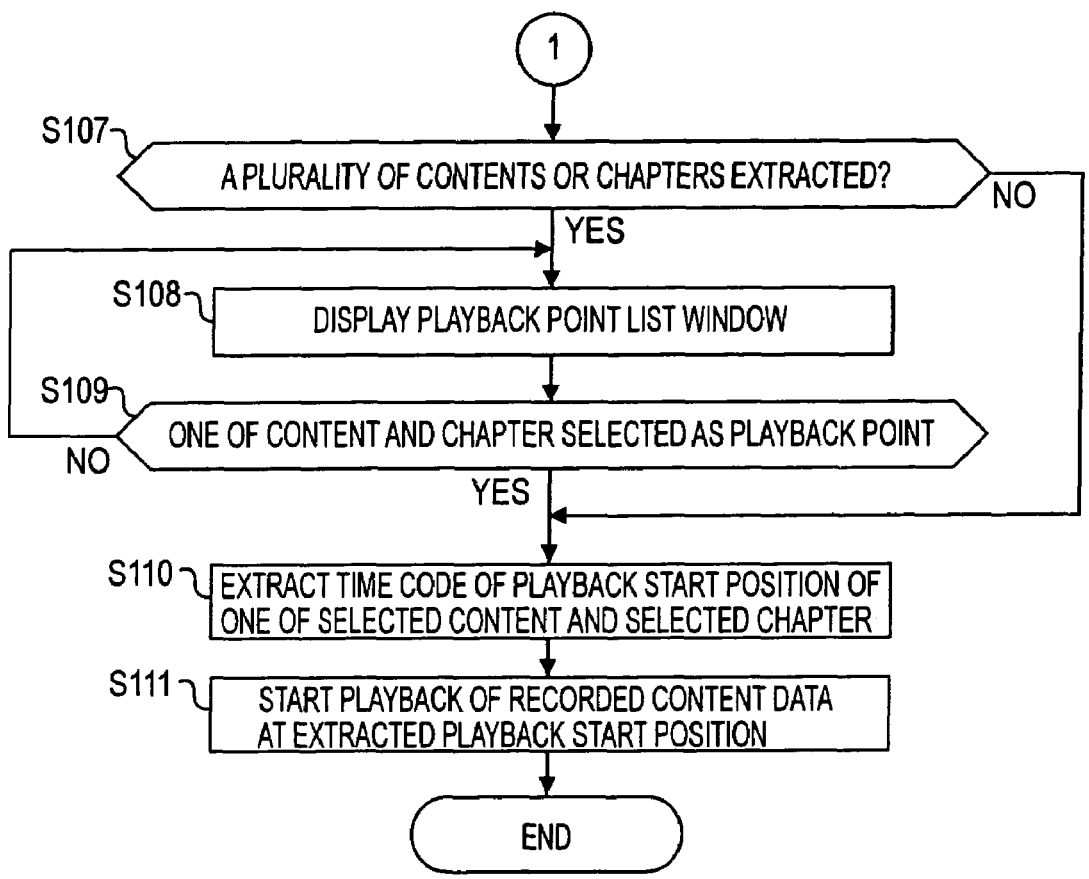
FIG. 24 is a flowchart illustrating the title selection and playback process.

The information processing apparatus further includes a playback control unit (for example, the CPU 51 performing steps S106 through S111 of FIGS. 23 and 24) for controlling a playback start position corresponding to the first information based on time information of the first text data that is extracted from the fourth information matching second text data (for example, one of a title input in step S103 of FIG. 23 and a title selected in step S105 of FIG. 23) entered via the operational input unit by the user, wherein the time information of the breakpoint in addition to the first text data and the information of the breakpoint is bound to the fourth information.

The generating unit sorts, into a plurality of groups, the first text data, contained in the fourth information, in response to the operation input entered via the operational input unit by the user. The display control unit controls the displaying of a list of the first text data (for example, a title selection list box 262 of FIG. 26) contained in a predetermined one selected from the plurality of groups by the user. The playback control unit controls the playback start position of the first information based on the time information corresponding to the first text data selected by the user as a result of the user's referencing the list of the first text data displayed under the control of the display control unit.

The display control unit further controls the displaying of a list (a playback point list window 301 of FIG. 27) of information (for example, a program name, a title name, the date and time of image capturing, and the like) of a plurality of first text data if the plurality of first text data contained in the fourth information matching the second text data entered via the operational input means by the user are extracted. The playback control unit controls the playback start position of the first information based on the time information corresponding to the first text data selected by the user as a result of the user's referencing the list of the first text data displayed under the control of the operational display control unit.

An information processing method of one embodiment of the present invention for an information processing apparatus controlling the displaying of information (for example, the information processing apparatus of FIG. 3), includes steps of acquiring first information to be played back, and second information relating to a breakpoint candidate of the first information (for example, step S52 of FIG. 15) and controlling a display speed of the first information, acquired in the acquisition step, in response to the second information acquired in the acquisition step (for example, steps S53 through S59 of FIG. 15 and steps S66 and S67 of FIG. 16), wherein the display speed control step includes controlling the displaying of the first information based on the second information so that the first information is played back at a low speed within a predetermined period in the vicinity of the breakpoint candidate and at a high speed on the remaining period of the first information.

A computer program of one embodiment of the present invention for causing a computer to control the displaying of information, includes the same steps as those of the above-referenced information processing method.

Figure 3:
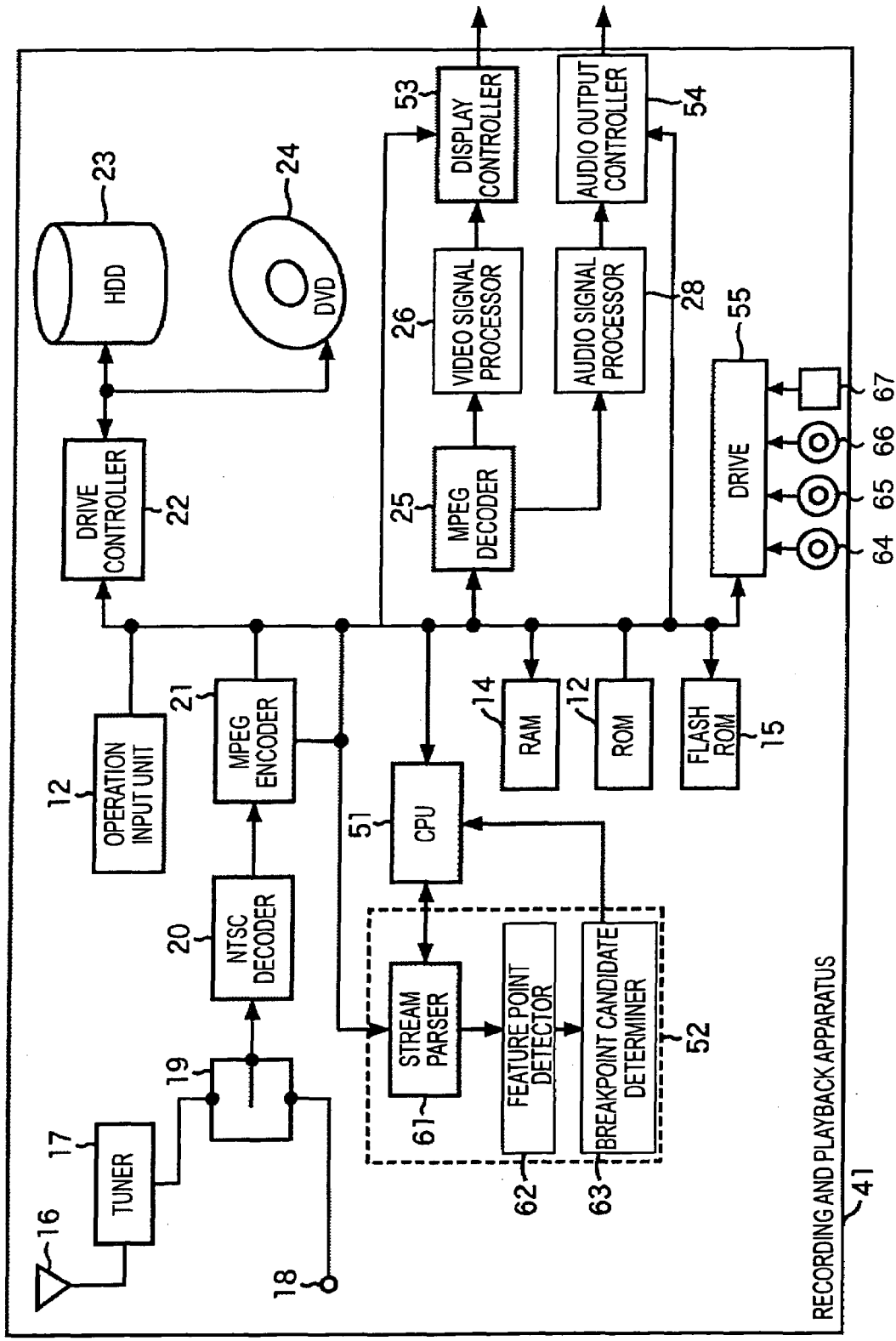
FIG. 3 is a block diagram illustrating a recording and playback apparatus in accordance with one embodiment of the present invention.
Figures 4, 5:
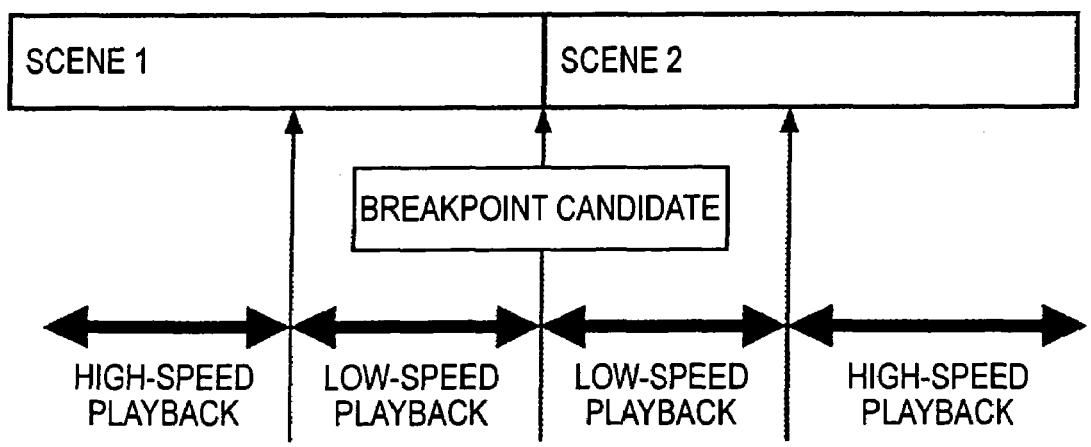
FIG. 4 illustrates time code data.
FIG. 5 illustrates a breakpoint candidate, a high-speed playback operation and a low-speed playback operation.

An information processing apparatus of another embodiment of the present invention (for example, the information processing apparatus of FIG. 3) includes an acquisition unit (for example, one of an antenna 16 and an input terminal 18 of FIG. 3) for acquiring first information to be recorded (for example, broadcast program data), a determining unit (for example, a breakpoint candidate setting processor 52 of FIG. 3) for determining a breakpoint candidate of the first information based on the first information acquired by the acquisition unit, a generating unit (for example, the CPU 51 of FIG. 3) for generating second information (for example, one of time code data and breakpoint candidate information of FIG. 4) containing information relating to the breakpoint candidate determined by the determining unit, and a recording unit (for example, the drive controller 22 of FIG. 3) for recording the first information acquired by the acquisition unit and the second information generated by the generating unit with the first information and the second information bound to each other.

The information processing apparatus further includes a display control unit (for example, a display controller 53 of FIG. 3) for controlling the displaying of the first information recorded by the recording unit, and a display speed control unit (for example, the CPU 51 of FIG. 3) for controlling a display speed of the first information, displayed under the control of the display control unit, in response to the second information recorded by the recording unit, wherein the display speed control unit controls the display speed of the first information in response to the second information so that the first information is played back at a low speed within a predetermined period in the vicinity of the breakpoint candidate and at a high speed on the remaining period of the first information.

An information processing method of one embodiment of the present invention for an information processing apparatus (for example, the information processing apparatus of FIG. 3) controlling the recording of information, includes steps of acquiring first information (for example, broadcast program data) to be recorded (for example, step S32 of FIG. 13), detecting information corresponding to a breakpoint candidate of the first information based on the first information acquired in the first information acquisition step (for example, step S35 of FIG. 13), generating second information (for example, one of the time code data and the breakpoint candidate information of FIG. 4) based on information of the breakpoint candidate detected in the detection step (for example, step S36 of FIG. 13), and controlling the recording of the first information acquired in the acquisition step and the second information generated in the generating step with the first information and the second information bound to each other (for example, step S37 of FIG. 13).

A computer program of one embodiment of the present invention for causing a computer to control the recording of information, includes the same steps as those of the above-referenced information processing step.

Referring to the drawings, embodiments of the present invention are described below.

FIG. 3 is a block diagram of a recording and playback apparatus 41 in accordance with one embodiment of the present invention.

With reference to FIG. 3, elements identical to those in the recording and playback apparatus 1 described with reference to FIG. 1 are designated with the same reference numerals and the discussion thereof is omitted. More specifically, the recording and playback apparatus 41 includes a CPU 51 in place of the CPU 11, a display controller 53 in place of the display controller 27, and an audio output controller 54 in place of the audio output controller 29. The recording and playback apparatus 41 further includes a breakpoint candidate setting processor 52, and a drive 55. The remaining portion of the recording and playback apparatus 41 is identical to the recording and playback apparatus 1.

The CPU 51 generally controls the recording and playback apparatus 41. In response to an operational input entered via an operation input unit 12 by a user, the CPU 51 reads a predetermined application from a ROM 13 and loads the read application to a RAM 14. More specifically, if a command to record broadcast program data (content data) selected by a tuner 17 or broadcast program data input via an input terminal 18 is issued, the CPU 51 causes an NTSC decoder 20 to decode the acquired broadcast program data in accordance with the NTSC system, and causes an MPEG encoder 21 to encode the decoded data in accordance with one of MPEG systems. The encoded data is transferred to a drive controller 22 to be recorded on one of a hard disk on an HDD 23 and a DVD on a DVD drive 24. The CPU 51 supplies the encoded broadcast program data to the breakpoint candidate setting processor 52 to set a breakpoint candidate. The CPU 51 further supplies the drive controller 22 with MPEG encoded data from the DVD loaded on the DVD drive 24, and records the MPEG encoded data onto the hard disk on the HDD 23. The CPU 51 also supplies the breakpoint candidate setting processor 52 with the data to set a breakpoint candidate. The operation of the breakpoint candidate setting processor 52 to set the breakpoint candidate is described later.

Based on the breakpoint set by the breakpoint candidate setting processor 52, the CPU 51 produces time code data to control a playback speed of content data (original data to be dubbed), such as broadcast program data to be played back in an editing process during a dubbing operation or recorded data. The CPU 51 records, on one of the hard disk of the HDD 23 and the DVD of the DVD drive 24, the time code data with the encoded content data bound thereto.

The CPU 51 records on the DVD on the DVD drive 24 a desired portion of the broadcast program data recorded on the hard disk on the HDD 23. The CPU 51 records on the hard disk on the HDD 23 a desired portion of the broadcast program data recorded on the DVD. In response to a dubbing start command, the CPU 51 controls the drive controller 22, thereby driving the HDD 23 to read content data recorded on one of the hard disk and the DVD and specified by the user. The CPU 51 causes the MPEG decoder 25 to decode the read data. The CPU 51 also reads the time code data recorded with the read content data bound thereto. Based on the time code data, the CPU 51 controls the display controller 53 in video displaying and the audio output controller 54 in audio data outputting.

The CPU 51 receives an operational input from a user who has viewed a display screen displayed under the control of the display controller 53 and has listened to an audio output under the control of the audio output controller 54. In response to the user operational input, the CPU 51 controls the displaying of display controller 53 and audio data outputting of the audio output controller 54. Upon receiving an operational input specifying a breakpoint and an operational input command to annotate the breakpoint with a title, the CPU 51 stores information of the breakpoint and the title onto the RAM 14. When the playback of the content to be dubbed is completed, the CPU 51 performs a dubbing process based on the information of the breakpoint and the title. More specifically, a user-desired portion of the content data recorded on one of the hard disk of the HDD 23 and the DVD loaded on the DVD drive 24 is recorded onto one of the DVD loaded on the DVD drive 24 and the hard disk of the HDD 23.

The CPU 51 acquires electronic program guide (EPG) information supplied from the input terminal 18 to assist the user in scheduling video recording. The EPG information can also be used as a title of the broadcast program data.

The breakpoint candidate setting processor 52 includes a stream parser 61, a feature point detector 62, and a breakpoint candidate determiner 63. Under the control of the CPU 51, the stream parser 61 parses stream data as the broadcast program data. The feature point detector 62 uses any of known techniques. For example, the feature point detector 62 detects a scene change by calculating a difference in video information between a prior frame and a subsequent frame from among frames of moving images. The feature point detector 62 thus detects a feature point as a breakpoint candidate from the stream data, and supplies the detection results to the breakpoint candidate determiner 63. The present invention is not limited to the above-described feature detection method. Any other detection method can be used. The breakpoint candidate determiner 63 determines a breakpoint candidate based on the feature detection results of the stream data, and information of the determined breakpoint candidate is supplied to the CPU 51.

The display controller 53, under the control of the CPU 51, controls the displaying of the supplied video signal on one of a television receiver and an external monitor. The display screen for the playback process in the editing operation is described later. The audio output controller 54, under the control of the CPU 51, controls the audio outputting of one of the television receiver and an external loudspeaker device in response to the supplied audio signal so that the output audio signal corresponds to the display screen presented by one of the television receiver and the external monitor.

When one of recording media including a magnetic disk 64, an optical disk 65, a magneto-optic disk 66, and a semiconductor memory 67 is loaded, the drive 55 drives the loaded medium to acquire programs and data stored thereon. The programs and data are transferred to the CPU 51 and then recorded onto the RAM 14, as necessary.

The operation of the recording and playback apparatus 41 is described below with reference to FIG. 3.

The user uses the operation input unit 12 to issue a command to record one of the broadcast program data selected by the tuner 17 and the broadcast program data input via the input terminal 18. The CPU 51 causes the NTSC decoder 20 to decode the acquired broadcast program data in accordance with the NTSC system, and causes the MPEG encoder 21 to encode the decoded data in accordance with any of the MPEG systems. The encoded signal is then supplied to the drive controller 22 to be recorded onto the hard disk of the HDD 23 while also being supplied to the breakpoint candidate setting processor 52.

The user loads, onto the DVD drive 24, a DVD having data recorded thereon with a DVD camcorder, and commands the operation input unit 12 to dub the data onto the hard disk of the HDD 23. The CPU 51 controls the drive controller 22 to read, from the DVD drive 24, a content to be dubbed, and supplies the content to the hard disk of the HDD 23. Similarly, the read data is supplied to the breakpoint candidate setting processor 52.

The stream parser 61 in the breakpoint candidate setting processor 52, under the control of the CPU 51, parses the content data in the form of stream supplied as one of the broadcast program data and the data recorded on the DVD. The feature point detector 62 detects the feature point as a breakpoint of the stream data, and supplies the detection results to the breakpoint candidate determiner 63. The breakpoint candidate determiner 63 determines a breakpoint candidate based on the detection results of the feature point of the stream data as the broadcast program data. The breakpoint candidate determiner 63 supplies information concerning the determined breakpoint candidate to the CPU 51.

Figure 6:
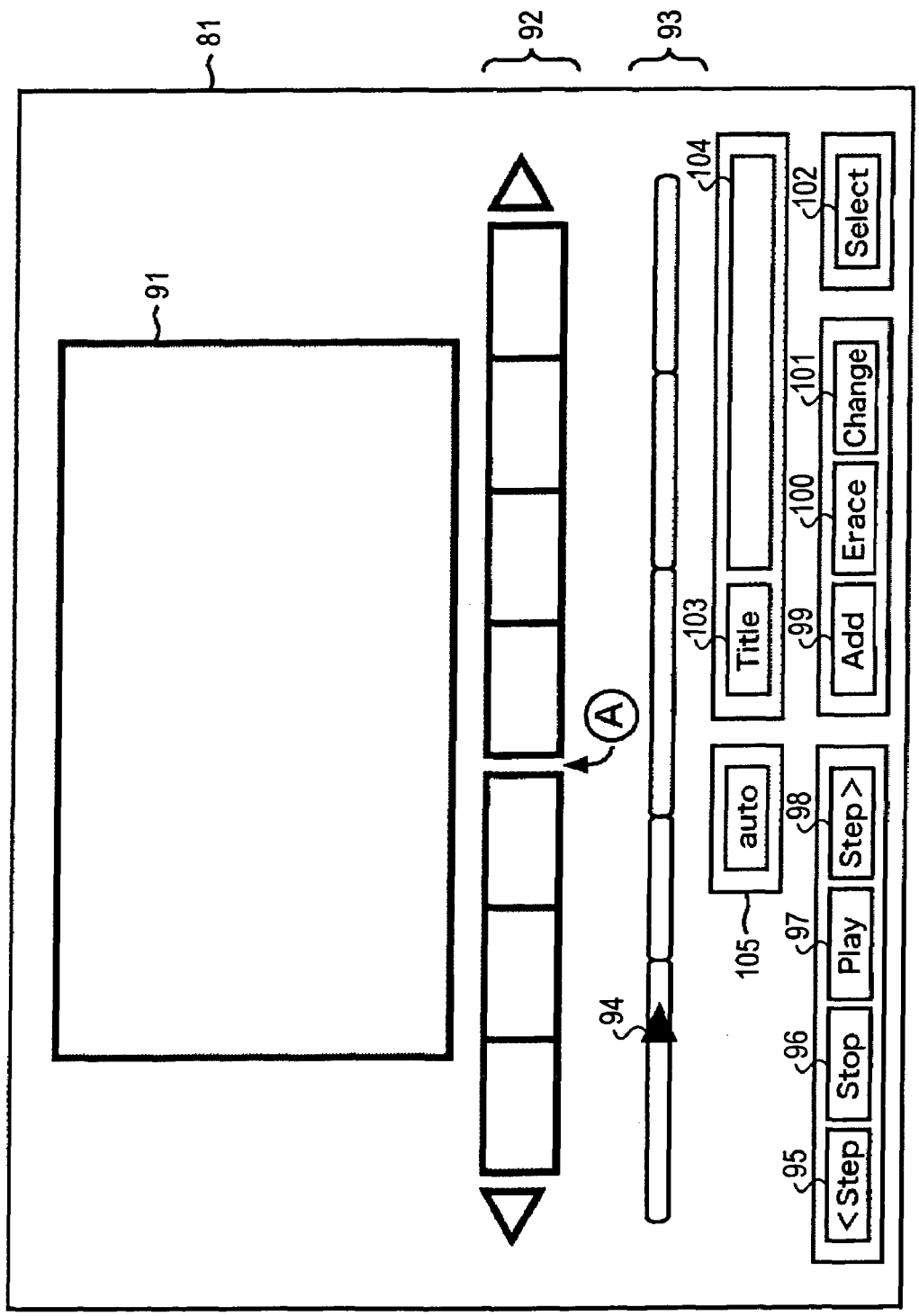
FIG. 6 illustrates a display screen in a playback operation for editing.

Based on the breakpoint candidate set by the breakpoint candidate setting processor 52, the CPU 51 produces the time code data to control the playback speed of the broadcast program data (original program data to be dubbed). FIG. 6 illustrates the time code data.

The time code data contains a file name and a content identification (ID) identifying individual recorded content data (pre-dubbing original program). The time code data further contains information sets of the number equal to the number of breakpoint candidates set by the breakpoint candidate setting processor 52, each information set composed of a low-speed playback start time code, a breakpoint candidate position time code and a low-speed playback end code.

The low-speed playback start time code, the breakpoint candidate position time code, and the low-speed playback end code are described below with reference to FIG. 5.

The breakpoint candidate partitions the content data into a scene 1 and a scene 2. In the known editing process, the user plays back the content at a high speed in an area where any breakpoint is unlikely. The user continuously monitors the video. Meanwhile the user enters operational inputs to stop the playback operation, plays back the content at a reduced speed, plays back the content in a frame advance mode, or rewinds the content by a small amount after playing back a breakpoint (in other words, after recognizing the breakpoint). The breakpoint is thus fixed. A segment requiring the user's attention for recognition of video and audio is likely to appear prior to or subsequent to a portion of the breakpoint candidate.

The CPU 51 plays back the content at a speed as high as the speed at which the user can still view the broadcast program image from the start in the playback process for editing. With respect to the breakpoint candidate set by the breakpoint candidate setting processor 52, a predetermined segment of the content is automatically played back at a low speed, and the remaining part of the content is automatically played back at a high speed if no user command is input. To perform such an operation, the time code data is produced. The time code data contains the low-speed playback start time code, the breakpoint candidate position time code, and the low-speed playback end code respectively corresponding to a low-speed playback start position, a breakpoint candidate position, and a low-speed playback end position. For example, the time code is time relative to time zero set at the video recording start position of the original broadcast program.

The CPU 51 supplies the produced time code data to the drive controller 22, thereby controlling the drive controller 22 to record the time code onto the hard disk of the HDD 23 with the encoded broadcast program data (the original broadcast program data to be recorded onto the HDD 23) bound to the time code.

The user may use the operation input unit 12 to issue a dubbing start command to record a desired portion of the content recorded on the hard disk of the HDD 23 onto the DVD loaded on the DVD drive 24 or a desired portion of the contented recorded on the DVD loaded on the DVD drive 24 to the hard disk of the HDD 23. The CPU 51 controls the drive controller 22, and drives one of the HDD 23 and the DVD drive 24 to read the content desired by the user from one of the hard disk and the DVD. The read content is supplied to the MPEG decoder 25. Upon receiving the original program data played back and supplied by the drive controller 22, the MPEG decoder 25 decodes the original data supplied in accordance with one of the MPEG systems (including MPEG2, MPEG4). The resulting video signal is supplied to the video signal processor 26 and the resulting audio signal is supplied to the audio signal processor 28. The video signal processor 26 performs predetermined processes on the decoded video signal and supplies the processed signal to the display controller 53. The audio signal processor 28 performs predetermined processes on the decoded audio signal and supplies the processed audio signal to the audio output controller 54.

The CPU 51 reads the time code data recorded with the broadcast program data bound thereto, from the HDD 23. Based on one of the time code data and the information corresponding to the operational input entered by the user via the operation input unit 12, the CPU 51 controls the video displaying of the display controller 53 and the audio data outputting of the audio output controller 54.

Upon receiving an operational input command for dubbing, the CPU 51 starts the playback process for editing. The CPU 51 plays back the original data from the head thereof at a speed as high as the user can still view the image of the program data. Based on one of the time code data and the information of the user operational input entered by the user via the operation input unit 12, the CPU 51 controls the video displaying of the display controller 53 and the audio data outputting of the audio output controller 54.

A display screen 81 for an edit point setting process activated in response to the dubbing start command is described below with reference to FIG. 6.

The display screen 81 includes a still and moving image window 91, a thumbnail image display area 92, a chapter display area 93, a reverse frame playback button 95 through a select button 102, a title button 103, a text box 104, and an auto rewind and playback button 105.

A video is displayed under the control of the display controller 53 in the still and moving image window 91. A thumbnail image of the video prior to and subsequent to the breakpoint candidate is displayed on the thumbnail image display area 92. A blank portion of the thumbnail image labeled the letter A indicates the location of the currently set breakpoint. Displayed on the chapter display area 93 are a graphic diagrammatically showing a chapter partitioned by the currently set breakpoint candidate and a cursor 94 indicating a location within the chapter of the video displayed on the still and moving image window 91.

The user uses the reverse frame playback button 95 to perform a reverse frame playback operation on the video displayed on the still and moving image window 91. A stop button 96 is used by the user to stop the playback of the video displayed on the still and moving image window 91. A standard playback button 97 is used by the user to play back the content at a standard playback speed. A forward frame playback button 98 is used by the user to perform a forward frame playback operation on the video displayed on the still and moving image window 91.

A breakpoint add button 99 is used by the user to issue a command to add a new breakpoint to a location in the video displayed on the still and moving image window 91. A breakpoint erase button 100 is used by the user to erase a breakpoint closest to the video displayed on the still and moving image window 91, namely, a breakpoint set at the location indicated by the blank portion A in the thumbnail image display area 92. A breakpoint change button 101 is used by the user to change a breakpoint closest in position to the video displayed on the still and moving image window 91, namely, a breakpoint set at the location indicated by the blank portion A in the thumbnail image display area 92.

A title button 103 is used by the user to issue a command to input a title of the chapter delimited by the breakpoint set by the user. After selecting the title button 103, the user enters a text to be registered as a title in a text box 104.

An auto rewind and playback button 105 is used by the user to automatically play back the frames in a forward direction for the user to acknowledge the breakpoint and to issue a change command after a predetermined range of the content is automatically rewound.

From among graphics diagrammatically representing chapters displayed on the chapter display area 93, the user selects any graphic representing a particular chapter. The selection of the chapter is fixed by the select button 102. The setting process of setting the chapter being dubbed with the select button 102 always remains executable regardless of the playback speed and display status of the video displayed on the still and moving image window 91.

The user references the chapter display area 93 and acknowledges a location within the chapter of the video displayed on the still and moving image window 91. The user also references the thumbnail image display area 92 and acknowledges a thumbnail image representing the image prior to or subsequent to the breakpoint candidate. The user thus determines whether to set up the currently set breakpoint candidate as a breakpoint, whether to set up the currently set breakpoint as a breakpoint with the location thereof changed, whether to erase position information of the breakpoint candidate without setting the current breakpoint candidate as a breakpoint, or whether to set a new breakpoint.

More specifically, if the user enters a dubbing start command, the video displayed on the still and moving image window 91 is automatically played back at a high speed until a portion of the video corresponding to the low-speed playback start time code in the vicinity of the breakpoint candidate is reached. The high-speed playback, once selected, continues until the playback position reaches a portion of the video corresponding to the low-speed playback end code in the vicinity of the breakpoint candidate as long as the user selects none of the reverse frame playback button 95, the stop button 96, the standard playback button 97, and the forward frame playback button 98.

As shown in FIG. 7, the high-speed playback is automatically performed until the playback operation reaches a low-speed playback start position corresponding to the low-speed playback start code in the vicinity of the breakpoint candidate in the video displayed on the still and moving image window 91. When the playback operation reaches the low-speed playback start position, the low-speed playback starts. After the playback of the breakpoint is completed, the high-speed playback start position corresponding to the low-speed playback end code is reached. If the user selects, throughout these series of process steps, none of the reverse frame playback button 95, the stop button 96, the standard playback button 97, and the forward frame playback button 98, the apparatus recognizes that the user has set the breakpoint candidate as a breakpoint as a result of acknowledgement of the breakpoint candidate. The breakpoint candidate is set as the breakpoint, and the breakpoint between the scene 1 and the scene 2 thus coincides with the breakpoint of the original data.

Figure 8:
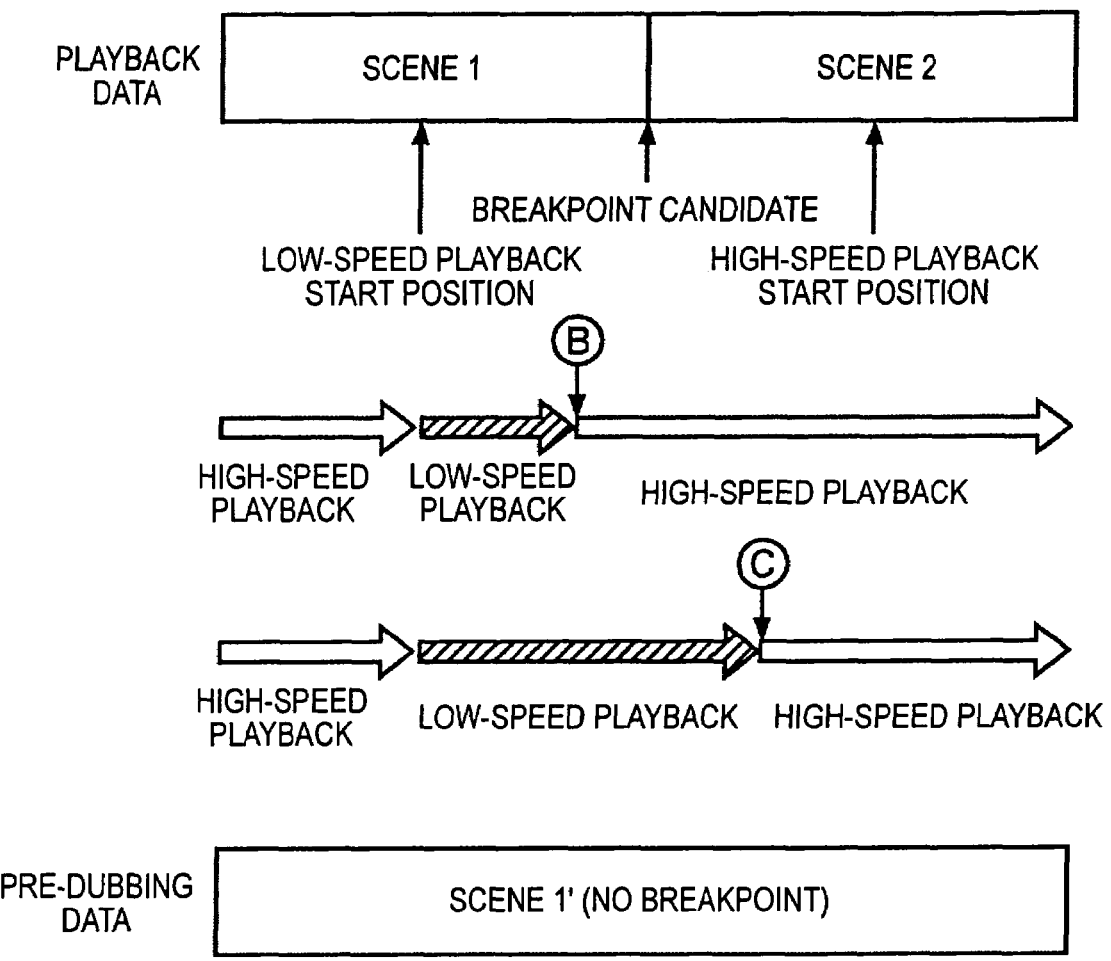
FIG. 8 illustrates the playback operation for editing.

As shown in FIG. 8, the high-speed playback is automatically performed until the low-speed playback start position corresponding to the low-speed playback start code in the vicinity of the breakpoint candidate is reached on the video displayed on the still and moving image window 91. The low-speed playback is performed from when the playback operation reaches the low-speed playback start position in the vicinity of the breakpoint candidate represented to a point labeled the letter B in a circle. If the user selects the breakpoint erase button 100 within a duration from when the low-speed playback begins at the low-speed playback start position in the vicinity of the breakpoint candidate to a point prior to the end of the playback of the breakpoint candidate at the point B in a circle, or within a duration from when the playback of the breakpoint candidate is completed to the high-speed playback start position at a point C in a circle corresponding to the low-speed playback end code, the breakpoint candidate set between the scene 1 and the scene 2 is erased. The subsequent portion of the video is then automatically played back at a high speed. With the breakpoint candidate erased, the scene 1 and the scene 2 are regarded as the same chapter, namely, a scene 1'.

Figure 9:
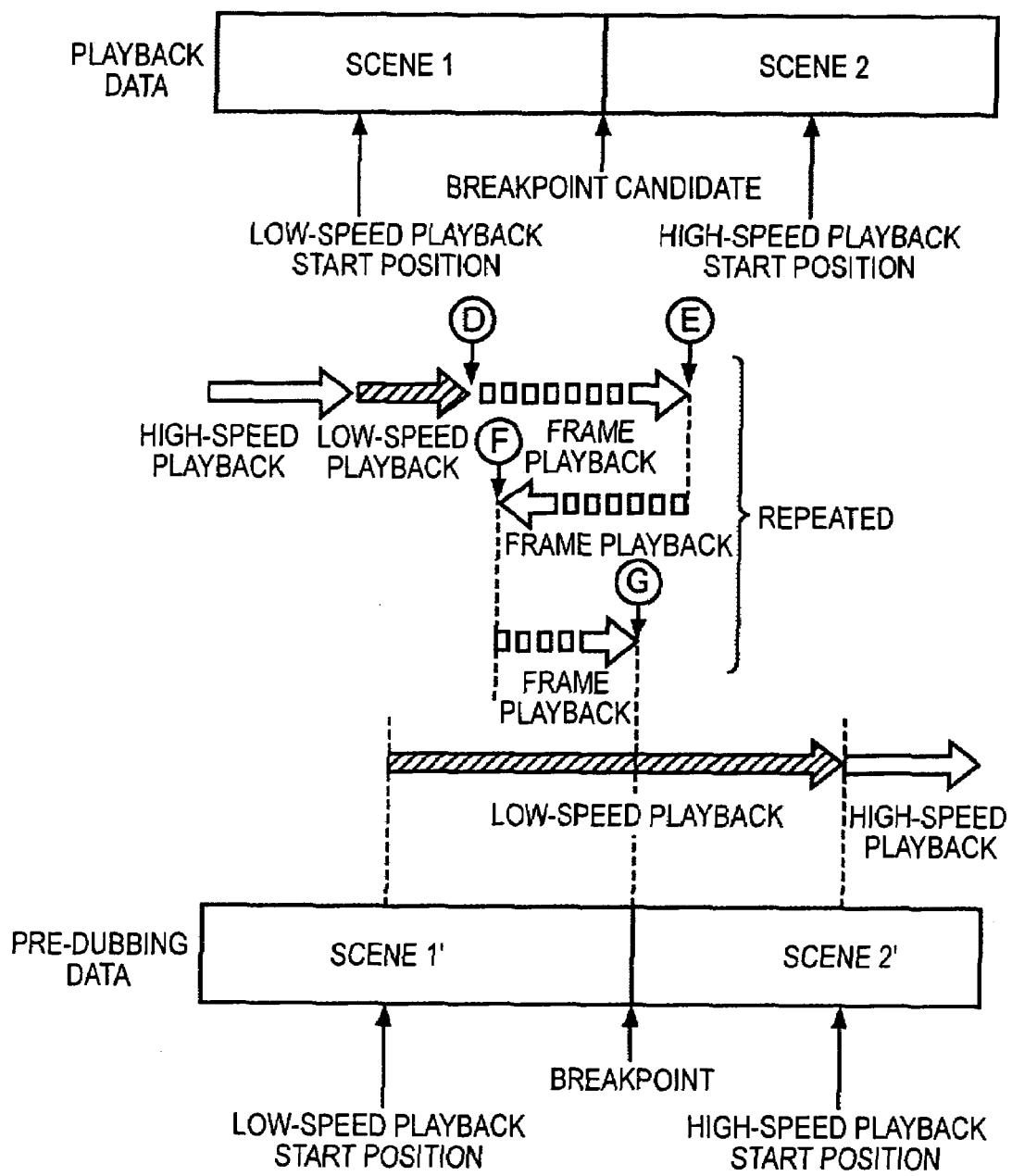
FIG. 9 illustrates the playback operation for editing.

As shown in FIG. 9, the video displayed on the still and moving image window 91 is automatically played back at a high speed until the low-speed playback start position corresponding to the low-speed playback start time code in the vicinity of the breakpoint candidate is reached. If the user selects one of the reverse frame playback button 95, the stop button 96, the standard playback button 97, and the forward frame playback button 98 within a duration from when the low-speed playback is performed after the playback operation reaches the low-speed playback start position in the vicinity of the breakpoint candidate to a point prior to the end of the playback of the breakpoint candidate or within a duration from when the end of the playback of the breakpoint candidate to the high-speed playback start position corresponding to the low-speed playback end code, the video displayed on the still and moving image window 91 is frame played back, stopped, or played back at the standard speed in response to the user operational input. If the user selects the breakpoint change button 101, the breakpoint is changed from the location of the breakpoint candidate.

More specifically, the playback operation reaches the low-speed playback start position in the vicinity of the breakpoint candidate and the low-speed playback is performed. For example, at a point D, the forward frame playback button 98 is selected. Forward frame playback is thus performed. At a point E, the reverse frame playback button 95 is selected to perform reverse frame playback. At a point F, the forward frame playback button 98 is selected to perform the forward frame playback. As necessary, these process steps can be repeated, and other operational inputs can be entered. The user thus fixes the breakpoint and if the breakpoint change button 101 is selected at a point G, the breakpoint is changed in position from the breakpoint candidate.

In accordance with the newly set breakpoint, the delimiter between a scene 1' and a scene 2', corresponding to the scene 1 and the scene 2, is set. The low-speed playback start position and the high-speed playback start position are also changed. If the breakpoint change button 101 is selected to set a breakpoint at a location different from that of the breakpoint candidate, the still and moving image window 91 displays a video played back at a low speed from a low-speed playback start position prior to the newly set breakpoint candidate. The low-speed playback continues until the new high-speed playback start position so that the user acknowledges the set position of the breakpoint. If the user selects none of the reverse frame playback button 95, the stop button 96, the standard playback button 97, and the forward frame playback button 98 before the video displayed on the still and moving image window 91 reaches the high-speed playback start position corresponding to the low-speed playback end code, the high-speed playback resumes in an playback operation subsequent to the high-speed playback start position.

Figure 10:
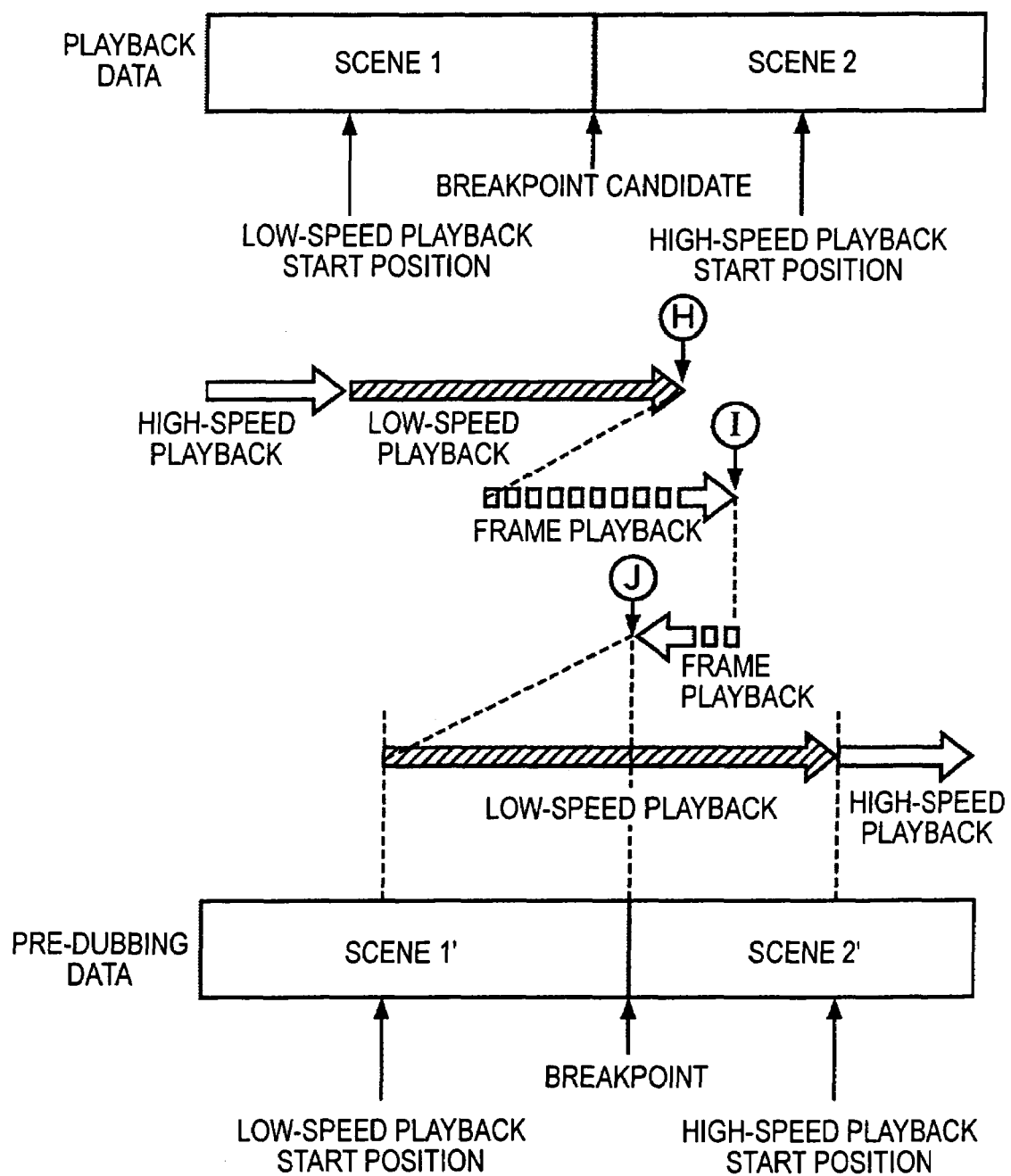
FIG. 10 illustrates the playback operation for editing.

As shown in FIG. 10, the video is automatically played back on the still and moving image window 91 at a high speed until the low-speed playback start position corresponding to the low-speed playback start time code in the vicinity of the breakpoint candidate. If the user selects the auto rewind and playback button 105 within a duration from when the low-speed playback starts at the low-speed playback start position in the vicinity of the breakpoint candidate to the high-speed playback start position corresponding to the low-speed playback end code subsequent to the end of the playback of the breakpoint candidate, the video displayed on the still and moving image window 91 is automatically rewound by a predetermined segment and then frame played back in response to the user operational input. If the user selects one of the reverse frame playback button 95, the stop button 96, and the forward frame playback button 98, the video displayed on the still and moving image window 91 is then frame played back, or stopped in response to the user operational input. If the user selects the breakpoint change button 101, the breakpoint is changed in position from the breakpoint candidate.

More specifically, the low-speed playback is performed when the playback operation reaches the low-speed playback start position in the vicinity of the breakpoint candidate. For example, if the auto rewind and playback button 105 is selected at a point H, the video is frame played back after being rewound by a predetermined segment. If the reverse frame playback button 95 is selected at a point I, the reverse frame playback is performed. As necessary, these process steps can be repeated or operational inputs other than these inputs can be entered. The user thus fixes the breakpoint in position. With the breakpoint change button 101 selected, the breakpoint is changed in position from the breakpoint candidate.

In accordance with the newly set breakpoint, the delimiter between a scene 1' and a scene 2', corresponding to the scene 1 and the scene 2, is set. The low-speed playback start position and the high-speed playback start position are also changed. If the breakpoint change button 101 is selected to set a breakpoint at a location different from that of the breakpoint candidate, the still and moving image window 91 displays a video played back at a low speed from a low-speed playback start position prior to the newly set breakpoint candidate. The low-speed playback continues until the new high-speed playback start position so that the user acknowledges the set position of the breakpoint. If the user selects none of the reverse frame playback button 95, the stop button 96, the standard playback button 97, and the forward frame playback button 98 before the video displayed on the still and moving image window 91 reaches the high-speed playback start position corresponding to the low-speed playback end code, the high-speed playback resumes in an playback operation subsequent to the high-speed playback start position.

With reference to FIGS. 7 through 10, control of the playback speed of the content for setting the breakpoint in the editing process has been discussed. The playback speed is switched between the high speed and the low speed, and further the standard-speed playback and the frame playback are also executed as necessary in response to the user operational input. The pattern of the playback speed may be changed to include an intermediate speed in addition to the low speed and the high speed.

Figure 11:
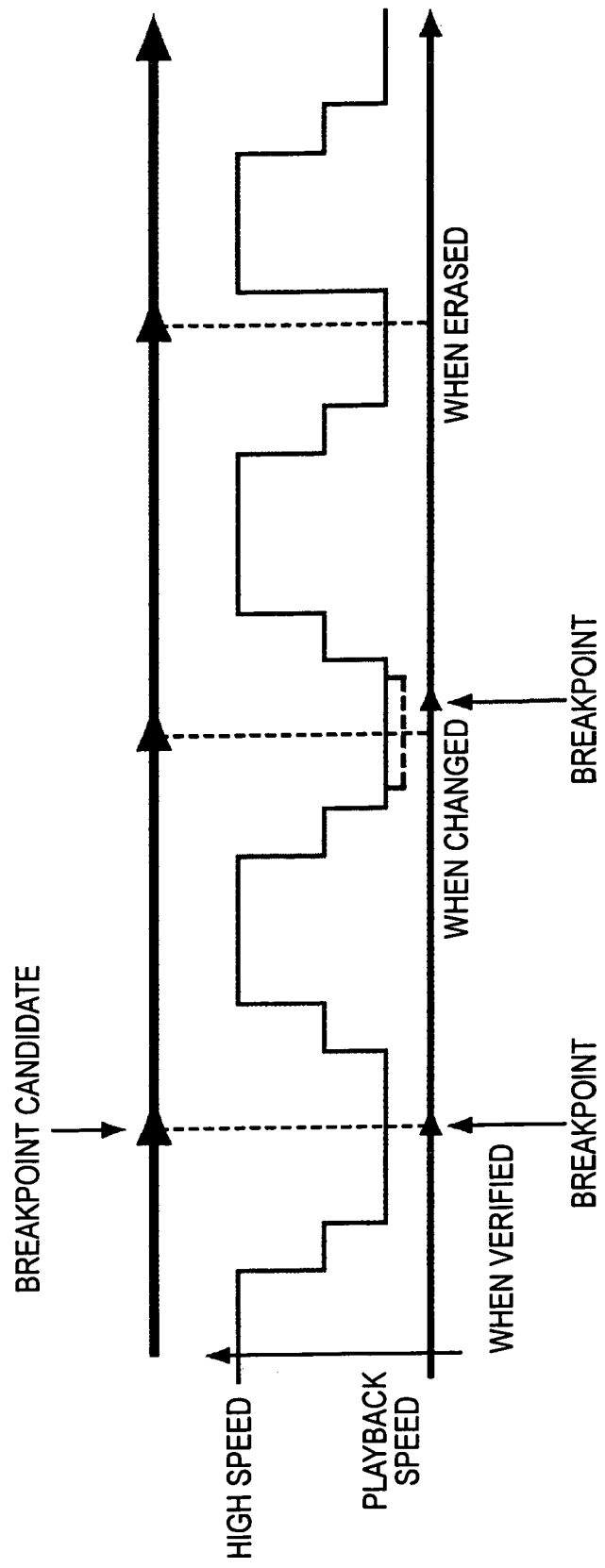
FIG. 11 illustrates the high-speed, intermediate-speed, and low-speed playback operations.

The control of the playback speed by switching one speed to another among the low speed, the intermediate speed, and the high speed is described below with reference to FIG. 11.

At an intermediate-speed playback start position subsequent to the high-speed playback for the editing process, an intermediate-speed playback starts. At a predetermined low-speed playback start position, the low-speed playback starts. The playback of the breakpoint candidate is then completed. At a predetermined intermediate-speed playback start position, the intermediate-speed playback resumes. At a predetermined high-speed playback start position, then high-speed playback resumes. If no operational input is entered by the user until the high-speed playback resumes, the breakpoint candidate is set as a breakpoint.

At an intermediate-speed playback start position subsequent to the high-speed playback for the editing process, an intermediate-speed playback starts. At a predetermined low-speed playback start position, the low-speed playback starts. If a command for the frame playback is entered by the user prior to or subsequent to the breakpoint candidate, the playback speed is changed in response to the user operational input. If an user operational input to change the breakpoint in position is entered, a breakpoint is set at a location different from the location of the breakpoint candidate. In a similar manner as previously discussed, the low-speed playback is performed again in the vicinity of the newly set breakpoint. At a predetermined intermediate-speed playback start position, the intermediate-speed playback starts, and then at a predetermined high-speed playback start position, the high-speed playback resumes.

Subsequent to the high-speed playback for the editing process, the intermediate-speed playback starts at an intermediate-speed playback start position in the vicinity of the breakpoint candidate, and then the low-speed playback starts at a predetermined low-speed playback start position. If the user issues a command to erase the breakpoint candidate in the vicinity of the breakpoint candidate (a location subsequent to the breakpoint candidate in FIG. 11), the setting of the breakpoint candidate is canceled, and the high-speed playback resumes without executing the intermediate-speed playback.

Even during the high-speed playback, the user can modify the playback speed by selecting one of the reverse frame playback button 95, the stop button 96, the standard playback button 97, and the forward frame playback button 98 discussed with reference to FIG. 6. The user also can set a new edit point at any position by selecting the breakpoint add button 99 as previously discussed with reference to FIG. 6.

Figure 12A:
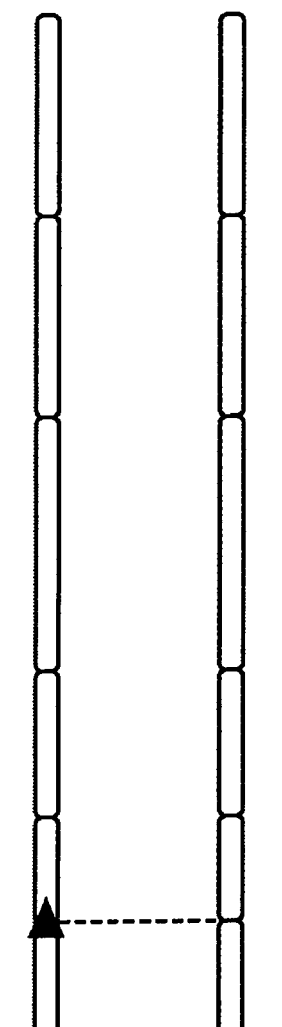
FIGS. 12A and 12B illustrate a modified display indicating a breakpoint of a chapter.
Figure 12B:
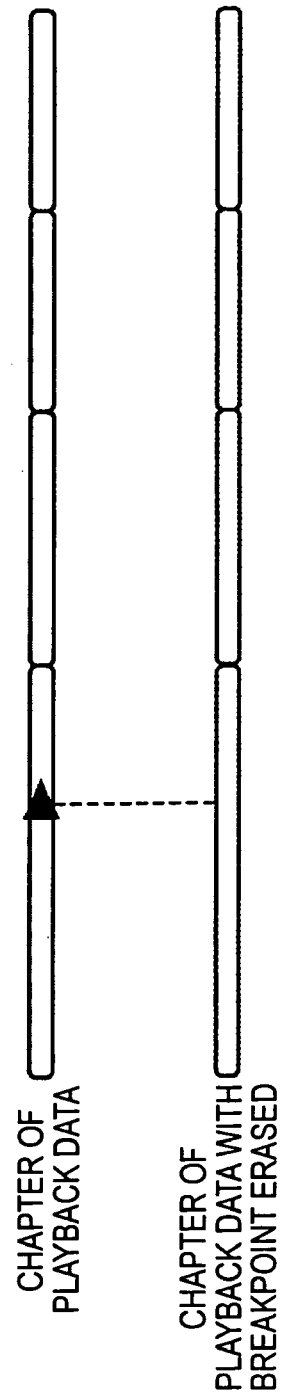

If the user sets a new edit point, or if the user erases a breakpoint candidate, the graphic representing the chapter of the chapter display area 93 of FIG. 6 is modified with the edit point updated. More specifically, if a breakpoint is added to the data to be played back for the editing process, the graphic representing the chapter of the chapter display area 93 is modified as in FIG. 12A to show the user that the chapter is partitioned by a newly set breakpoint. If the breakpoint candidate is erased from the data to be played back in the editing process, the graphic representing the chapter of the chapter display area 93 is also modified as in FIG. 12B to show the user that the chapter is united by erasing the breakpoint.

A broadcast signal reception and recording process in accordance with one embodiment of the present invention is described below with reference to a flowchart of FIG. 13.

In step S31, the CPU 51 determines from a signal supplied from the operation input unit 12 whether an operational input to command reception and recording of a broadcast signal has been received from the user. If it is determined in step S31 that no operational input to command reception and recording of a broadcast signal has been received, the process in step S31 is repeated until it is determined that an operational input to command reception and recording of a broadcast signal has been received from the user.

If it is determined in step S31 that an operational input to command reception and recording of a broadcast signal has been received from the user, the CPU 51 controls the tuner 17 and the switch 19 in step S32 to receive a broadcast signal desired by the user and select the corresponding channel. The tuner 17 selects the broadcast signal received via the antenna 16, and supplies the resulting broadcast signal to the NTSC decoder 20 via the switch 19.

The NTSC decoder 20 and the MPEG encoder 21 perform respective processes on the broadcast signal received by the antenna 16 and selected by the tuner 17. More specifically, the NTSC decoder 20 decodes the supplied signal in accordance with the NTSC system, and supplies the decoded signal to the MPEG encoder 21. The MPEG encoder 21 encodes (compresses) the supplied data in accordance with the MPEG standard (such as MPEG2 or MPEG4), and supplies the encoded data to the breakpoint candidate setting processor 52.

In step S34, the CPU 51 extracts a title of a broadcast program the user has issued commands to receive and record, from the EPG data supplied via the input terminal 18. Alternatively, the CPU 51 may let the user to input a title of a broadcast program to be recorded. Alternatively, a title may be generated based on the date of recording of the broadcast program. In this way, the title of the broadcast program is recorded.

In step S35, the stream parser 61 in the breakpoint candidate setting processor 52, under the control of the CPU 51, parses the stream data supplied as the broadcast program data. The feature point detector 62 uses one of the known techniques, such as detecting a scene change by calculating a difference in the video information between prior and subsequent frames, to a feature point as a breakpoint candidate from the broadcast program data as the stream data. The detection results are then supplied to the breakpoint candidate determiner 63. The present invention is not limited to the above-referenced feature point detection method. Any feature point detection method can be used.

In step S36, the breakpoint candidate determiner 63 determines the breakpoint candidate based on the detection results of the feature point of the stream data as the broadcast program data. The determined breakpoint is then supplied to the CPU 51. Based on the information concerning the breakpoint candidate, the CPU 51 fixes the low-speed playback start position and the high-speed playback start position, thereby producing the time code data discussed with reference to FIG. 4.

In step S37, the CPU 51 supplies the drive controller 22 with the broadcast signal encoded in accordance with one of MPEG standards (including MPEG 2, and MPEG 4) in step S33, the title acquired in step S34, and the breakpoint candidate information (the generated time code data discussed with reference to FIG. 4) fixed in step S36. The broadcast signal is recorded onto the hard disk of the HDD 23 with the breakpoint candidate information, and the acquired title bound thereto.

In step S38, the CPU 51 determines whether the recording of the broadcast program data has ended. If it is determined in step S38 that the recording of the broadcast program data has not ended, processing returns to step S32 to repeat step S32 and subsequent steps. If it is determined in step S38 that the recording of the broadcast program data has ended, processing ends.

In this way, the broadcast program data has been received and recorded, the feature point of the recorded broadcast program data is extracted. Based on the extracted feature point, the breakpoint candidate is determined. The breakpoint candidate is recorded with the title and the broadcast program data bound thereto. When the recorded broadcast program is dubbed, the playback speed control is performed based on the breakpoint candidate during the playback for the editing process.

Figure 14:
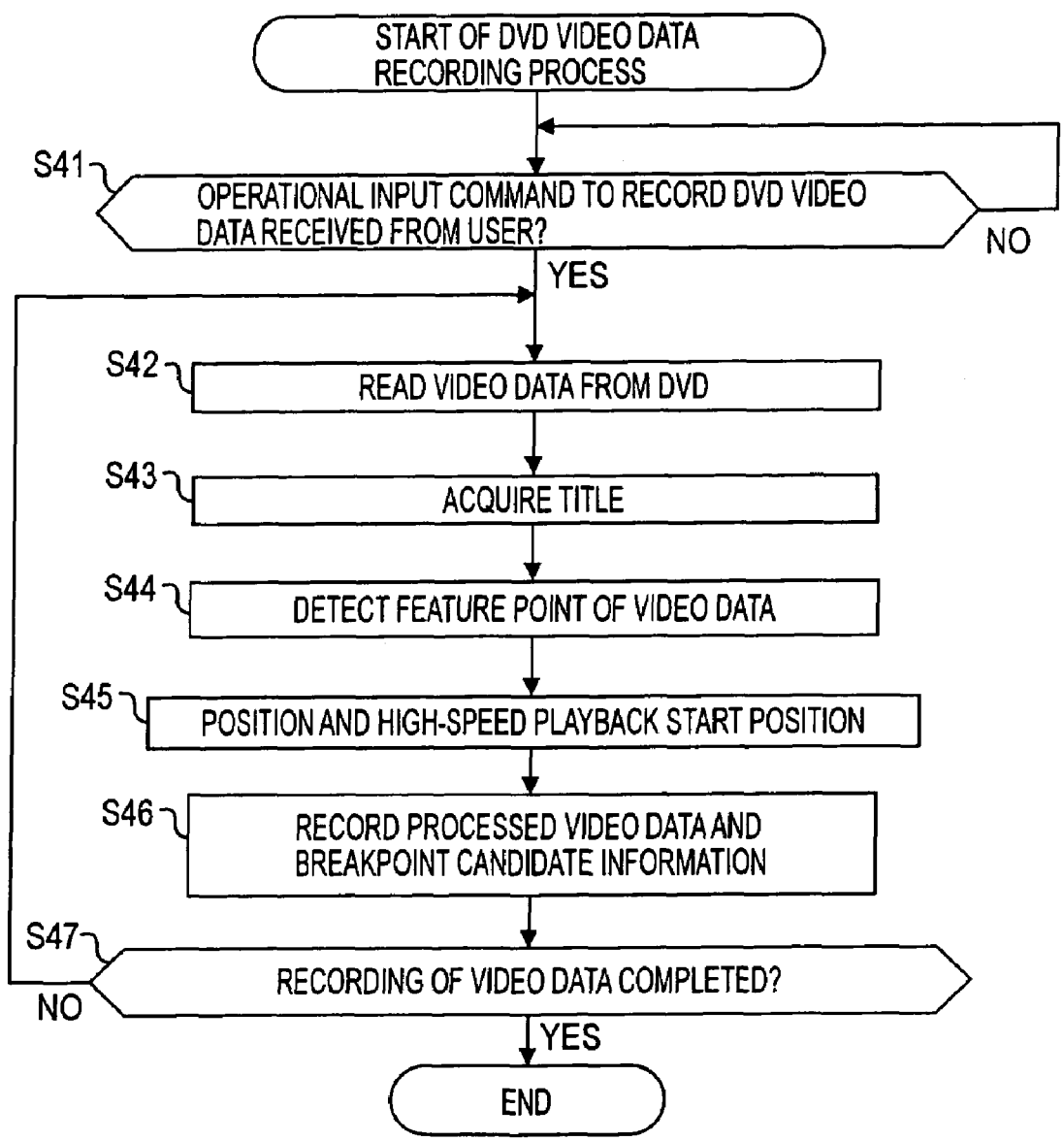
FIG. 14 is a flowchart illustrating a video data recording process of a DVD.

A video data recording process on a DVD in accordance with one embodiment of the present invention is described below with reference to a flowchart of FIG. 14.

In step S41, the CPU 51 determines in response to a signal supplied from the operation input unit 12 whether an operational input command to record the video data recorded on the DVD loaded on the DVD drive 24 onto the hard disk of the HDD 23 has been received from the user. If it is determined in step S41 that an operational input command to record the video data has not been received from the user, the process in step S41 is repeated until it is determined that the an operational input command to record the video data is received.

If it is determined in step S41 that an operational input command to record the video data has been received from the user, the CPU 51 controls the drive controller 22 to read the video data recorded on the DVD loaded on the DVD drive 24 and supply the read video data to the breakpoint candidate setting processor 52 in step S42. In step S43, the CPU 51 acquires information recorded with the video data bound thereto, specifically information, such as the date and time of recording, serving as a title of the content data.

In step S44, the stream parser 61 in the breakpoint candidate setting processor 52, under the control of the CPU 51, parses the stream data as the video data recorded on the DVD. The feature point detector 62 uses one of the known techniques, such as detecting a scene change by calculating a difference in the video information between prior and subsequent frames, to a feature point as a breakpoint candidate from the broadcast program data as the stream data. The detection results are then supplied to the breakpoint candidate determiner 63. The present invention is not limited to the above-referenced feature point detection method. Any feature point detection method can be used.

In step S45, the breakpoint candidate determiner 63 determines the breakpoint candidate based on the detection results of the feature point of the stream data as the broadcast program data. The determined breakpoint is then supplied to the CPU 51. Based on the information concerning the breakpoint candidate, the CPU 51 fixes the low-speed playback start position and the high-speed playback start position, thereby producing the time code data discussed with reference to FIG. 4.

In step S46, the CPU 51 supplies the drive controller 22 with the read video data, the breakpoint candidate information determined in step S45 (the generated time code data discussed with reference to FIG. 4), and the title acquired in step S43. The video signal is recorded onto the hard disk of the HDD 23 with the breakpoint candidate information, and the acquired title bound thereto.

In step S47, the CPU 51 determines whether the recording of the video data has ended. If it is determined in step S47 that the recording of the video data has not ended, processing returns to step S42 to repeat step S42 and subsequent steps. If it is determined in step S47 that the recording of the video data has ended, processing ends.

In this way, the video data recorded on the DVD has been recorded, and the feature point of the recorded video data is extracted. Based on the extracted feature point, the breakpoint candidate is determined. The breakpoint candidate is recorded with the title and the video data bound thereto. When the recorded video data is dubbed, the playback speed control is performed based on the breakpoint candidate during the playback for the editing process.

Figure 15:
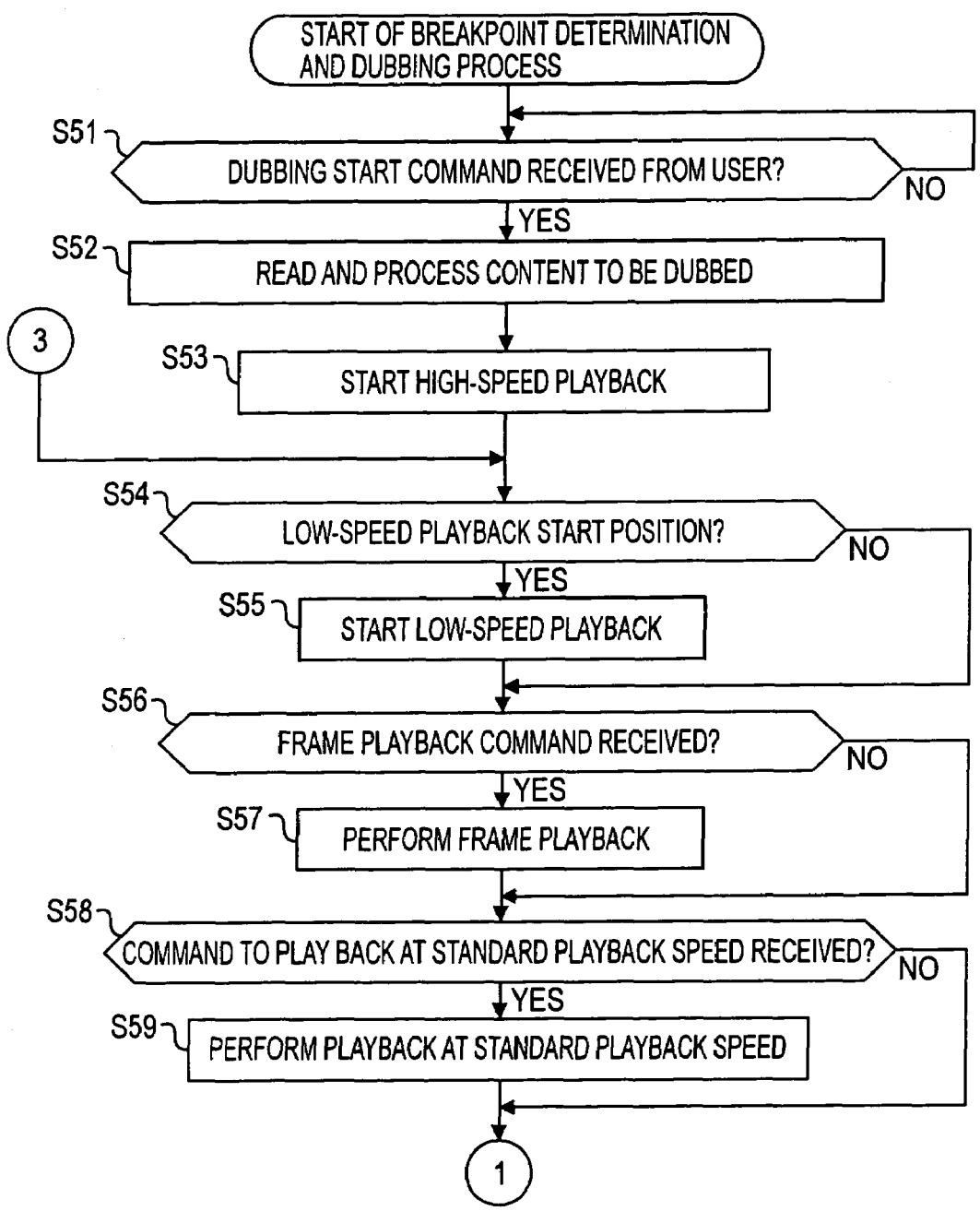
FIG. 15 is a flowchart illustrating a breakpoint determination and dubbing process.
Figure 16:
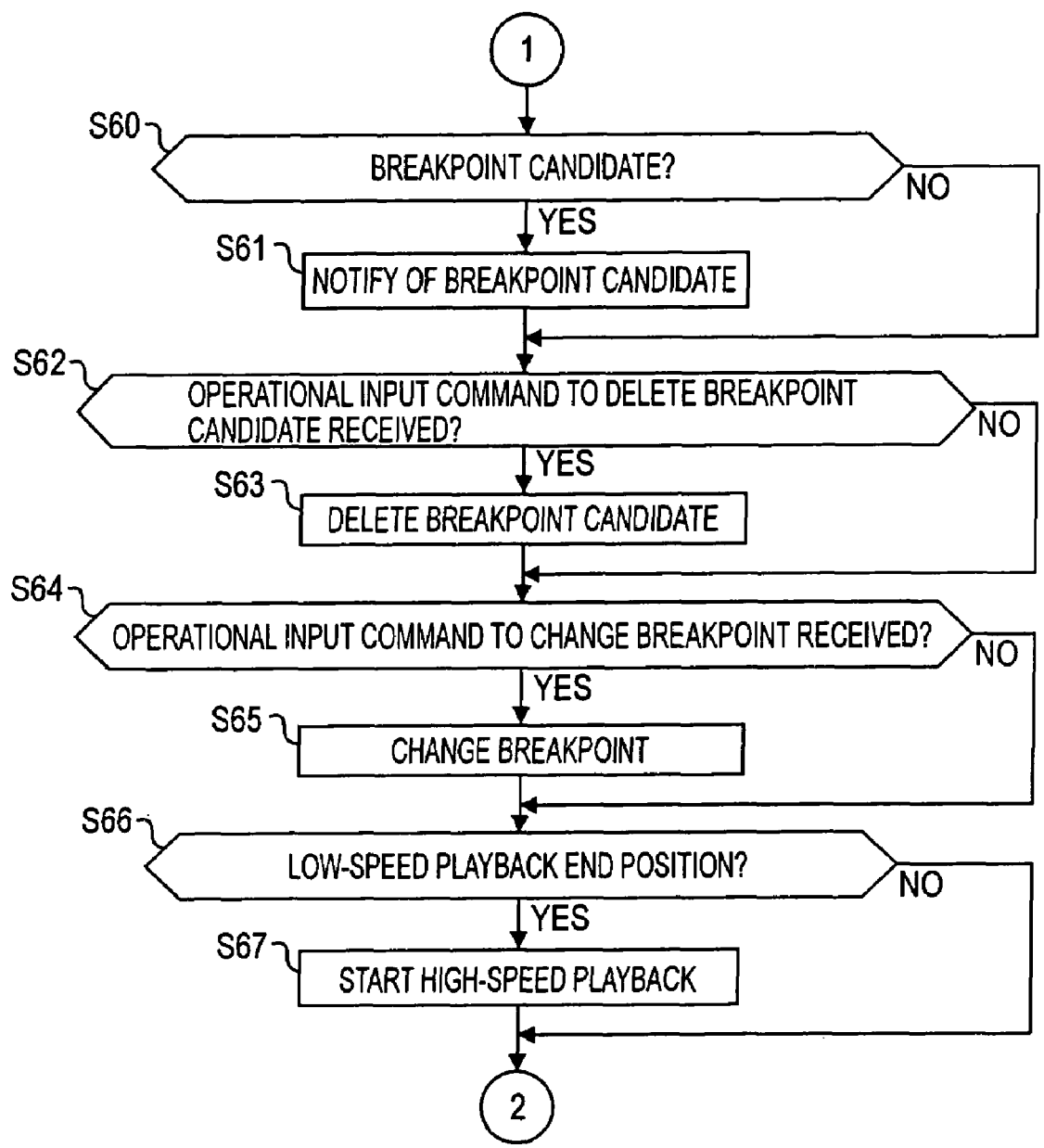
FIG. 16 is the flowchart illustrating the breakpoint determination and dubbing process.

The breakpoint candidate determination and dubbing process of one embodiment of the present invention is described below with reference to FIGS. 15 through 17. In the process discussed with reference to FIGS. 15 through 17, two speeds, namely, a high speed and a low speed, are used in the playback process control.

In step S51, the CPU 51 determines in response to a signal supplied from the operation input unit 12 whether a subbing start command has been received from the user. If it is determined in step S51 that no dubbing start command has been received from the user, the process in step S51 is repeated until a dubbing start command is received from the user.

If it is determined in step S51 that a dubbing start signal has been received from the user, the CPU 51 controls the drive controller 22 in step S52 to read, from one of the HDD 23 and the DVD drive 24, a content (data of an original program) to be dubbed, and supplies the read content to the MPEG decoder 25. The CPU 51 also controls the drive controller 22 to read the breakpoint candidate information, namely, the time code data discussed with reference to FIG. 4, and store the time code data onto the RAM 14. The MPEG decoder 25 decodes the supplied data, and then supplies video data to the video signal processor 26 and audio data to the audio signal processor 28. The video signal processor 26 performs predetermined processes to the decoded video data, and then supplies the processed data to the display controller 53. The audio signal processor 28 performs predetermined processes on the decoded audio data, and then supplies the processed data to the audio output controller 54.

In step S53, the CPU 51 controls the display controller 53 and the audio output controller 54 to start the high-speed playback.

In step S54, the CPU 51 determines based on the breakpoint candidate information read in step S52, namely, the time code data discussed with reference to FIG. 4 whether the playback operation reaches a low-speed playback start position.

If it is determined in step S54 that the playback operation reaches a low-speed playback start position, the CPU 51 controls in step S55 the display controller 53 and the audio output controller 54 to start the low-speed playback.

If it is determined in step S54 that the playback operation has not yet reached the low-speed playback start position, or subsequent to step S56, the CPU 51 determines in response to a signal supplied from the operation input unit 12 whether a frame playback command has been received from the user.

If it is determined in step S56 that a frame playback command has been received from the user, the CPU 51 controls the display controller 53 and the audio output controller 54 to start the frame playback.

If it is determined in step S56 that no frame playback command has been received from the user, or subsequent to step S57, the CPU 51 determines based on a signal from the operation input unit 12 in step S58 whether a standard-speed playback command has been received from the user.

If it is determined in step S58 that a standard-speed playback command has been received from the user, the CPU 51 controls the display controller 53 and the audio output controller 54 to start the standard-speed playback in step S59.

If it is determined in step S58 that no standard-speed playback command has been received from the user, or subsequent to step S59, the CPU 51 determines, in step S60, based on the breakpoint candidate information read in step S52, namely, the time code data discussed with reference to FIG. 4 whether the current playback position is at the breakpoint candidate.

If it is determined in step S60 that the current playback position is at the breakpoint candidate, the CPU 51 controls in step S61 one of the display controller 53 and the audio output controller 54 to notify the user in step S61 that the current playback position is at the breakpoint candidate. Any notification method can be used as long was the user is notified that the current playback position is at the breakpoint candidate. For example, the user can be notified of the breakpoint candidate by displaying a message, by outputting an audio message, or by flashing the cursor 94 on the display screen 81 discussed with reference to FIG. 6.

If it is determined in step S60 that the current playback position is not at the breakpoint candidate, or subsequent to step S61, the CPU 51 determines in step S62 in response to a signal supplied from the operation input unit 12 whether an operational input command to erase the breakpoint candidate has been received from the user.

If it is determined in step S62 that an operational input command to erase the breakpoint has been received from the user, the CPU 51 updates in step S63 the breakpoint candidate information stored in the RAM 14, namely, the time code data discussed with reference to FIG. 4 to erase information relating to the breakpoint candidate. The CPU 51 controls the display controller 53 and the audio output controller 54 to start the high-speed playback.

If it is determined in step S62 that an operational input command to erase the breakpoint candidate has not been input, or subsequent to step S63, the CPU 51 determines in step S64 in response to a signal supplied from the operation input unit 12 whether an operational input command to change the breakpoint in position has been received from the user.

If it is determined in step S64 that an operational input command to change the breakpoint has been received, the CPU 51 change in step S65 the breakpoint based on a signal supplied from the operation input unit 12 as previously discussed with reference to FIG. 9, and updates the breakpoint candidate information stored in the RAM 14, namely, the time code data discussed with reference to FIG. 4. The CPU 51 starts the low-speed playback at a low-speed playback start position prior to the newly set breakpoint candidate.

If it is determined in step S64 that an operational input command to change the breakpoint in position has not been received from the user, or subsequent to step S65, the CPU 51 determines in step S66 based on the breakpoint candidate information, namely, the time code data discussed with reference to FIG. 4 whether the playback operation is at the high-speed playback start position.

If it is determined in step S66 that the playback operation is at the high-speed playback start position, the CPU 51 controls the display controller 53 and the audio output controller 54 in step S67, thereby starting the high-speed playback. If the user has not input a command to erase or change the breakpoint candidate during the low-speed playback range, subsequent to the high-speed playback, the CPU 51 sets the breakpoint candidate within the low-speed playback range as a breakpoint.

If it is determined in step S66 that the playback operation is not at the high-speed playback start position, or subsequent to step S67, the CPU 51 determines in step S68 in response to a signal supplied from the operation input unit 12 whether an operational input command to perform automatic rewind, in other words, whether the auto rewind and playback button 105 in the display screen 81 discussed with reference to FIG. 6 has been selected.

Figure 20:
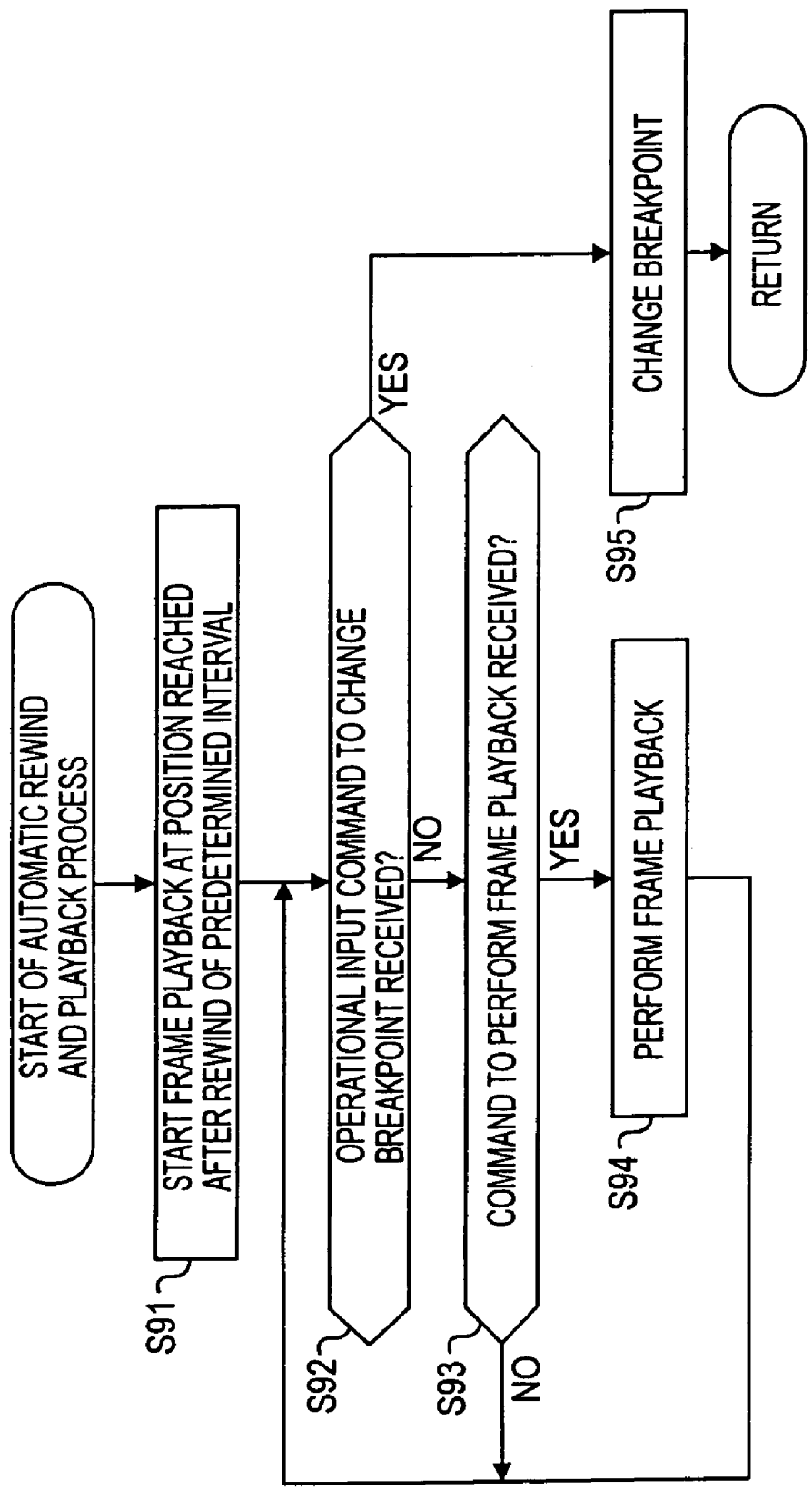
FIG. 20 illustrates an automatic rewind and playback process.

If it is determined in step S68 that an operational input command to perform automatic rewind has been input, the CPU 51 performs an automatic rewind and playback process in step S69 as described with reference to FIG. 20.

If it is determined in step S68 that an operational input command to perform the auto rewind and playback has not been received from the user, or subsequent to step S69, the CPU 51 determines in step S70 in response to a signal supplied from the operation input unit 12 whether an operational input indicating a title has been received from the user, namely, whether the title button 103 on the display screen 81 discussed with reference to FIG. 6 has been selected.

If it is determined in step S70 that an operational input indicating a title has been received, the user inputs a text as a title of a title of the chapter in the text box 104 in the display screen 81 discussed with reference to FIG. 6. In step S71, the CPU 51 records the text input in the text box 104 with the set breakpoint bound to, in response to a signal supplied from the operation input unit 12.

If it is determined in step S70 that no operational input indicating a title has been received from the user, or subsequent to step S71, the CPU 51 determines in step S72 whether the content to be dubbed has been played back to the end thereof. If it is determined in step S72 that the content to be dubbed has not been played back to the end thereof, processing returns to step S54 to repeat step S54 and subsequent steps.

If it is determined in step S72 that the content to be dubbed has been played back to the end thereof, the CPU 51 generates a title list listing titles attached to contents to be dubbed in step S73.

Figure 18:
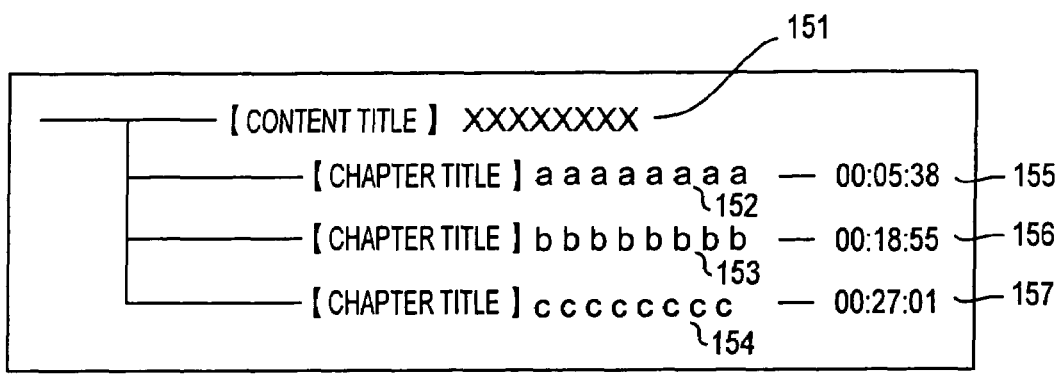
FIG. 18 illustrates a title list.

As shown in FIG. 18, the title list corresponding to the received broadcast program includes, as a content title 151, information extracted from the EPG data supplied via the input terminal 18, entered by the user, or generated from the date and time of recording of the broadcast program, and as chapter titles 152 through 154, titles recorded in step S71 by the user with the breakpoint bound thereto. The chapter titles 152 through 154 are bound to time stamps 155 through 157 of the breakpoints.

Figure 19:
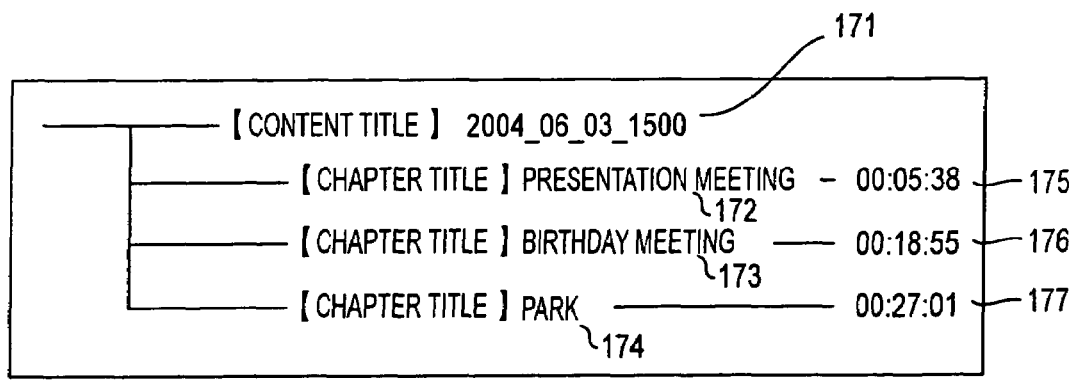
FIG. 19 illustrates the title list.

As shown in FIG. 19, the title list corresponding to the video data recorded on the DVD includes, as a content title 171, information such as the date and time of recording bound to the video data, and as chapter titles 172 through 174, titles recorded in step S71 by the user with the breakpoint bound thereto. The chapter titles 172 through 174 are also bound to time stamps 175 through 177 of the breakpoints.

In step S74, the CPU 51 performs the dubbing process based on the information concerning the breakpoint recorded on the RAM 14, namely, the time code data discussed with reference to FIG. 4. More specifically, the CPU 51 partitions the content recorded on the hard disk of the HDD 23 in accordance with the breakpoint recorded on the RAM 14, and supplies the partitioned content together with the produced tile list to one of the DVD loaded on the DVD drive 24 and the hard disk of the HDD 23 for recording.

The content to be dubbed (one of the broadcast program data and the data recorded on the DVD) is thus played back. In the vicinity of the breakpoint candidate, the playback speed is automatically controlled to a low speed. The user can determine the breakpoint (the in and out points or the breakpoint between chapters) between a portion to be dubbed and a portion not to be dubbed, in the content recorded on the hard disk of the HDD 23, with a relatively simple operation in comparison with the known art.

As described above, the time code data discussed with reference to FIG. 4 is produced based on the breakpoint candidate information. The time code data contains the breakpoint position time code corresponding to the breakpoint candidate, the low-speed playback start time code, and the low-speed playback end code. The broadcast program data is recorded with the time code data bound thereto. During the playback process for editing, the playback speed is controlled based on the time code data. Alternatively, the time code data may contain only the breakpoint candidate information. During the playback process for editing, the low-speed playback start time code and the low-speed playback end code are calculated from the breakpoint candidate information of the time code data each time to execute the playback control.

The low-speed playback start time code and the low-speed playback end code may be set a predetermined duration of time before and a predetermined duration of time after the breakpoint candidate. Alternatively, the low-speed playback start time code and the low-speed playback end code may be set based on a measure of scene dependency of scenes prior to and subsequent to a feature point (scene change) extracted by the breakpoint candidate setting processor 52.

The breakpoint candidate setting processor 52 not only sets the breakpoint based on the feature points such as the scene change but also sets the breakpoint candidate at regular periods. Based on the breakpoint candidates set at regular periods, the CPU 51 produces the time code data and controls the playback speed during the playback process for editing.

The CPU 51 can perform the playback process for editing and control the playback speed based on the assumption that the breakpoint candidates are set at regular periods. Prior to the playback process for editing, the user sets a breakpoint candidate corresponding to the content data recorded on the DVD loaded on the DVD drive 24.

When a dubbing start command is issued by the user, the information concerning the breakpoint candidate corresponding to the data recorded is acquired. The playback process for editing is executed, and the playback speed is controlled in a manner such that the user may easily perform an editing process.

Figure 17:
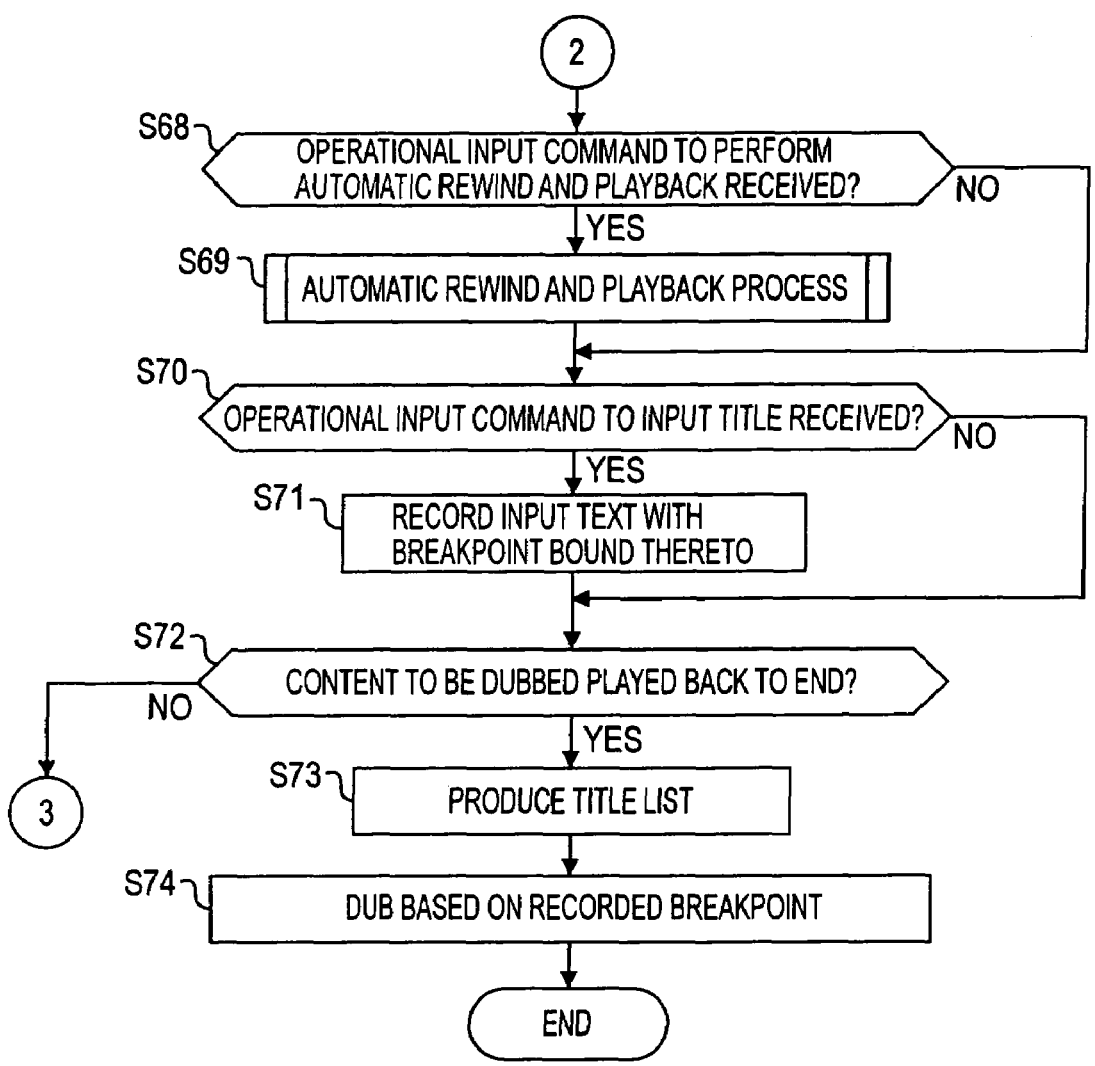
FIG. 17 is the flowchart illustrating the breakpoint determination and dubbing process.

The auto rewind and playback process executed in step S69 of FIG. 17 is described below with reference to a flowchart of FIG. 20.

In step S91, the CPU 51 controls the display controller 53 and the audio output controller 54 to start the frame playback at a location that is reached after a predetermined segment of rewinding as previously discussed.

In step S92, the CPU 51 determines in response to a signal supplied from the operation input unit 12 whether an operational input command to change the breakpoint in position has been received from the user.

If it is determined in step S92 that no operational input command to change the breakpoint has been received from the user, the CPU 51 determines in step S93 in response to a signal supplied from the operation input unit 12 whether a command to perform the frame playback has been received from the user.

If it is determined in step S93 that a command to perform the frame playback has been received from the user, the CPU 51 controls the display controller 53 and the audio output controller 54 in step S94, thereby starting the frame playback.

If it is determined in step S93 that the command to perform the frame playback has not been received from the user, or subsequent to step S94, processing returns to step S92 to repeat step S92 and subsequent steps.

If it is determined in step S92 that the operational input command to change the breakpoint has been received, the CPU 51 changes the breakpoint based on the signal input from the operation input unit 12 as previously discussed with reference to FIG. 10, and updates the breakpoint candidate information stored in the RAM 14, namely, the time code data discussed with reference to FIG. 4. The CPU 51 starts the low-speed playback at the low-speed playback start position before the newly set breakpoint candidate. Processing returns to step S69 of FIG. 17 to proceed to step S70.

In comparison with the known art, the editing operation of the user to determine the breakpoint in the dubbing process becomes simple, and the ease of operation is achieved.

The breakpoint candidate is estimated from video information to be recorded. The breakpoint candidate information or time code information calculated from the breakpoint candidate and used to control the playback speed is recorded with the data bound thereto. In the playback process for editing, the playback is automatically performed at a low speed in the vicinity of a location where the user is predicted to set the breakpoint. In the remaining part of the content, the playback is automatically performed at a high speed.

If the feature point (such as a scene change) is set as a breakpoint in the known art, the detected feature point is not necessarily set the user intends. In accordance with embodiments of the present invention, the detected feature point is set as a breakpoint candidate. With a simple operation, the user verifies, erases, or changes the breakpoint candidate, and checks the original data throughout. The user can set breakpoint candidates as intended.

The breakpoints can thus be set at portions of the recorded content data the user is particularly interested in. With the breakpoint associated with the title, the user can specify a desired playback start position by selecting a title. The user can specify the playback start position by selecting one from the content title attached to the content and the chapter title attached to the chapter.

The user may attach titles to chapters of the content data stored in a large-capacity storage such as the hard disk of the HDD 23. In this case, the number of titles becomes so large that the user has difficulty in specifying a desired playback position by selecting a title. To avoid such difficult, the titles are sorted by group. The user selects a desired group, and selects a title belonging to the selected group. In this way, the user can easily search for a desired title from among a large number of titles. The user can thus specify a desired playback position by selecting the title.

Figure 21:
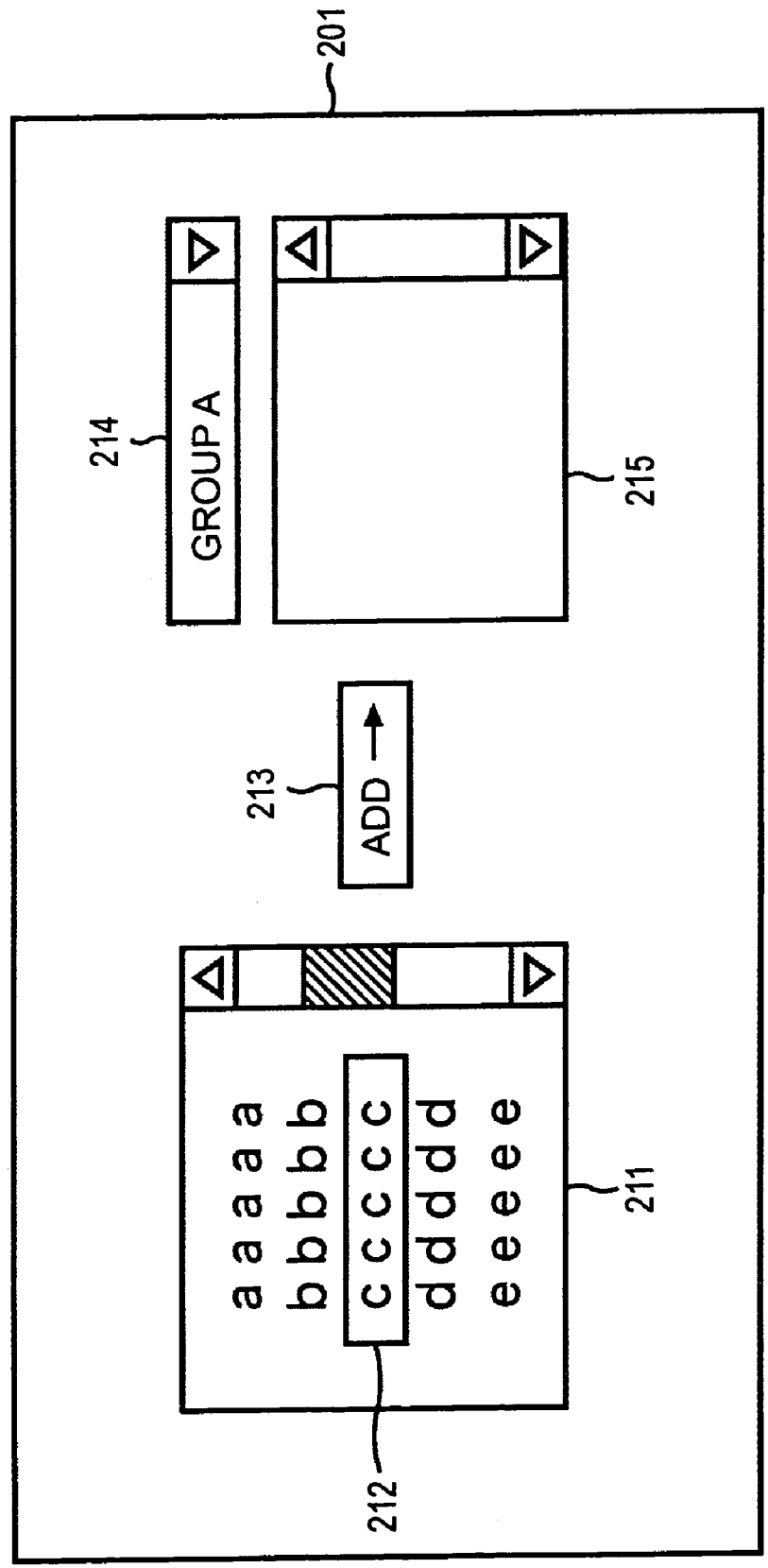
FIG. 21 illustrates a title group sorting process.

The group sorting can be performed using any method. One method is described below with reference to FIG. 21.

The display controller 53, under the control of the CPU 51, controls the displaying of a display screen 201 on an external display. The display screen 201 includes a title list 211, an add button 213, a group selection list box 214, and a group title list 215. A list of titles attached to chapters of the content data recorded on a large-capacity storage, such as the hard disk of the HDD 23 is displayed on the title list 211. The user places a cursor 212 to any location to select a desired title displayed on the title list 211. The add button 213 is used to add the title selected by the cursor 212 onto the group title list 215.

The group selection list box 214 in the form of a drop-down list box is used to select a group name corresponding to the title displayed on the group title list 215 or to generate a new group and to attach a group name to the new group. The titles belonging to the group under the group name displayed on the group selection list box 214 are displayed on the group title list 215.

The user operates the group selection list box 214, thereby selecting a desired group. The user selects a title the user desires to belong to the selected group by using the cursor 212. By selecting the add button 213, the user sorts the titles by group. Titles are permitted to belong to no group. Alternatively, one title can belong to a plurality of groups at the same time.

Figure 22:
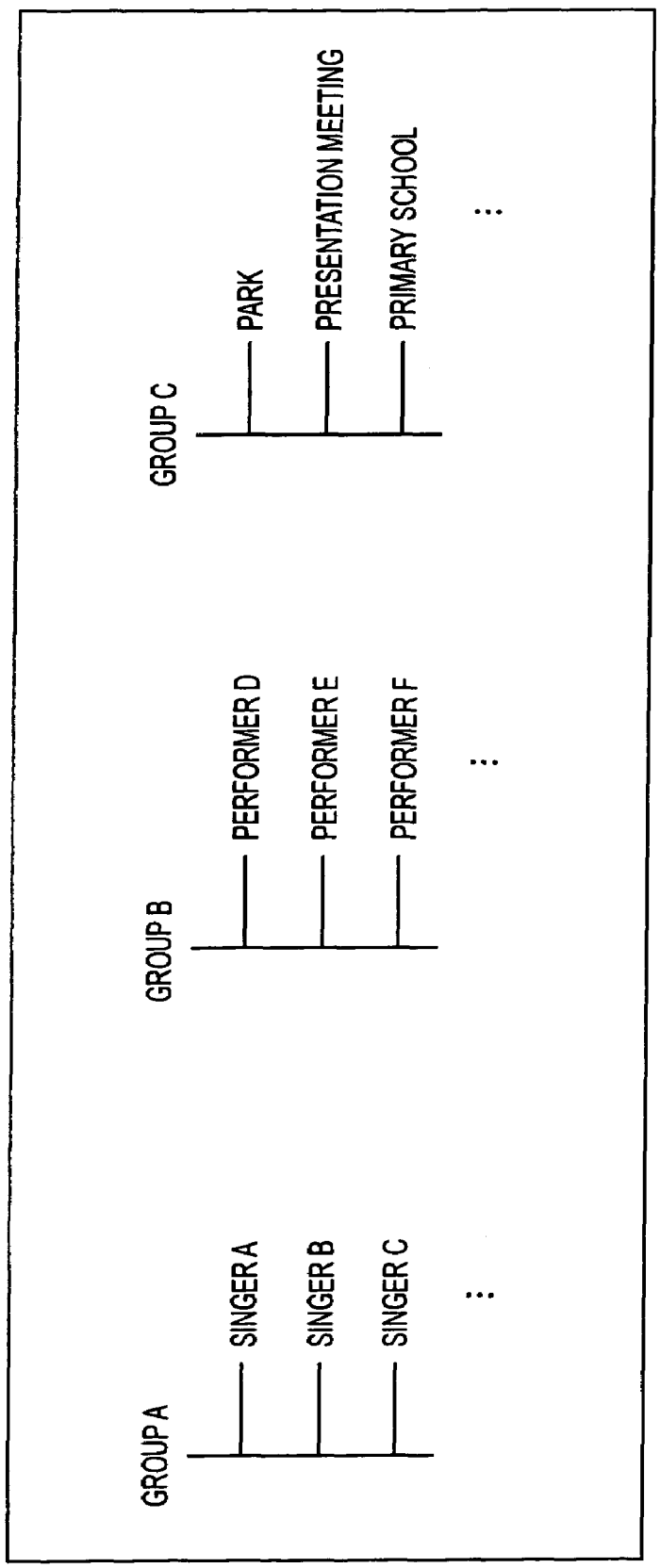
FIG. 22 illustrates the title group sorting process.

As shown in FIG. 22, a group A includes a variety of singers, for example, singer A, singer B, singer C, . . . , a group B includes a variety of performers, for example, performer D, performer E, performer F, . . . , and a group C includes events of a family, for example, park, presentation meeting, a primary school, . . . . The user may select one group, and references a list of titles registered in the selected group. The user thus easily searches for a desired title. The group sorting may be arranged in a tree structure or a folder structure so that one group is contained within another group.

Here, the groups A, B, C, . . . are used. The group name can be a text entered by the user, a numeral, or a combination of numeral and text.

A title selection playback process is described below with reference to flowcharts of FIGS. 23 and 24.

The CPU 51 determines in step S101 in response to a signal supplied from the operation input unit 12 whether an operational input command to start a title-specifying playback process has been received from the user. If it is determined in step S101 that the operational input command to start the title-specifying playback process has not been received from the user, the process in step S101 is repeated until it is determined that the operational input command to start the title-specifying playback process is received from the user.

Figure 25:
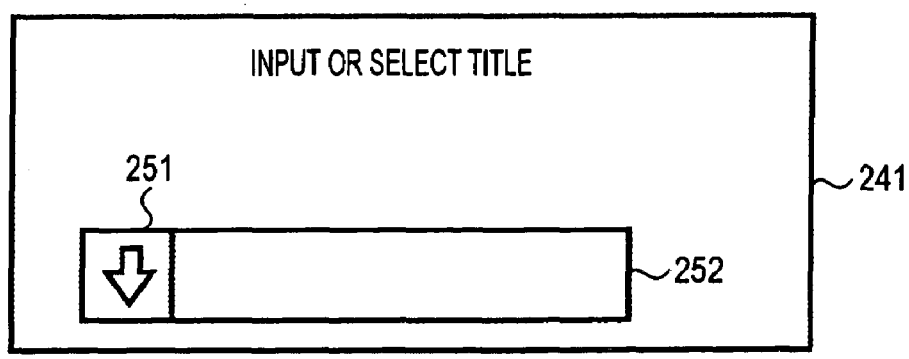
FIG. 25 illustrates an title input window.

If it is determined in step S101 that the operational input command to start the title-specifying playback process has been received from the user, the CPU 51 controls the display controller 53 in step S102, thereby causing an external display to display a title input window 241 of FIG. 25.

The title input window 241 includes a group selection button 251 and a text box 252.

In step S103, the CPU 51 determines, based on a signal supplied from the operation input unit 12, whether a text of a title to be searched is input to the text box 252 in the group selection button 251 by the user. If it is determined in step S103 that the text of the title has been input, processing proceeds to step S106.

If it is determined in step S103 that the text of the title has been input, the CPU 51 determines in step S104 in response to a signal supplied from the operation input unit 12 whether any group is selected with the group selection button 251 selected. If it is determined in step S104 that no group is selected, processing returns to step S103 to repeat step S103 and subsequent steps.

Figure 26:
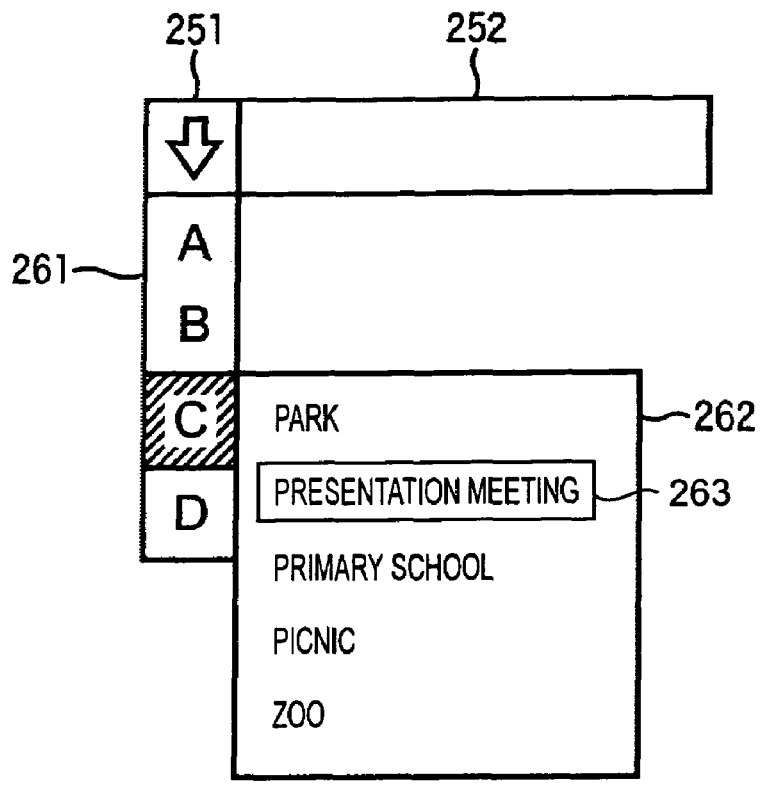
FIG. 26 illustrates the title input window.

When the group selection button 251 is selected, a group selection box 261 having group names appears under the group selection button 251 as shown in FIG. 26. The user can thus select any of a plurality of groups. If one of the groups in the group selection box 266 is selected, titles registered in the selected group are displayed on a title selection list box 262. The user can thus select a desired title by placing a cursor 263 to the location of the desired title. The present invention is not limited to the method of selecting group and the method of selecting text within the group discussed with reference to FIG. 26. Any other method can be used.

If any group is selected in step S104, the CPU 51 determines in step S105 in response to a signal supplied from the operation input unit 12 whether any title displayed on the title selection list box 262 is selected by the cursor 263. If it is determined in step S105 that no title is selected, processing returns to step S103 to repeat step S103 and subsequent steps.

If it is determined in step S103 that the text of the title has been input, or if it is determined in step S105 that any title has been selected, the CPU 51 references the title list discussed with reference to FIGS. 18 and 19 in step S106. With one of the input title and the selected title as a search key, the CPU 51 thus searches and extracts one of a content and a chapter, having the corresponding title as one of the content title and the chapter title, from the contents stored in one of the hard disk of the HDD 23 and the DVD loaded on the DVD drive 24.

In step S107, the CPU 51 determines whether a plurality of contents or chapters are extracted in step S106. If it is determined in step S107 that a plurality of contents or chapters are not extracted, processing proceeds to step S110.

Figure 27:
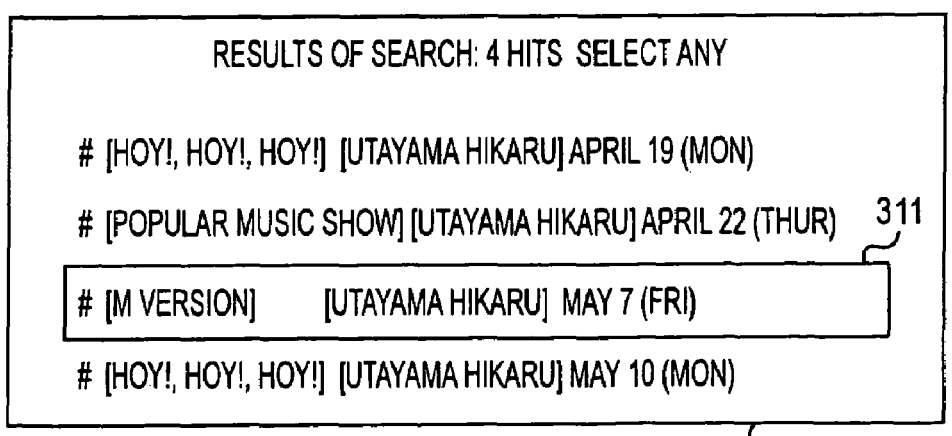
FIG. 27 illustrates a playback point list window.

If it is determined in step S107 that a plurality of contents or chapters are extracted, the CPU 51 controls the display controller 53 in step S108, thereby displaying a playback point list window 301 of FIG. 27 on an external display.

The playback point list window 301 shows the content name of the content and the chapter name of the chapter, each containing the title specified by the user, and information assisting the user in discriminating these contents and chapters, such as the date and time of recording. The user selects one of the contents and chapters using a cursor 311.

In step S109, the CPU 51 determines in response to an input supplied from the operation input unit 12 whether one of the contents and chapters displayed on the playback point list window 301 is selected as a playback point. If it is determined in step S109 that neither content nor chapter is selected, processing returns to step S108 to repeat step S108 and subsequent steps.

If it is determined in step S107 that a plurality of contents or chapters are not extracted, or if it is determined in step S109 that one of the contents and chapters is selected, the CPU 51 references in step S110 the title list discussed with reference to FIGS. 18 and 19 containing one of the selected content and the selected chapter to extract the time code data at the playback start position.

In step S111, the CPU 51 searches for one of the content and chapter specified by the user, from among the content data stored one of the hard disk of the HDD 23 and the DVD loaded on the DVD drive 24. The CPU 51 controls the playback of the video data at the playback position indicated by the extracted time code, and ends the process. More specifically, the CPU 51 controls the drive controller 22 to read one of the searched content and the searched chapter from the playback start position extracted in step S110, and to supply the read content or chapter to the MPEG decoder 25. The MPEG decoder 25 decodes the supplied data, and then supplies a resulting video signal to the video signal processor 26 and a resulting audio signal to the audio signal processor 28. The video signal processor 26 performs predetermined processes on the decoded video signal and then supplies the processed signal to the display controller 53. The audio signal processor 28 performs predetermined processes on the decoded audio signal, and supplies the audio output controller 54 with the processed audio signal.

The titles attached to the breakpoint set at any position by the user is used as a search key in the same way as the title of the content is used. With a simple operation, the title is selected by the user. The user thus specifies a desired playback start position of the content data recorded on one of the hard disk of the HDD 23 and the DVD loaded on the DVD drive 24 by a simple operational command.

The above-references series of steps can be performed by software. If the series of steps is performed by software, a program forming the software is installed from a recording medium or via a network onto a computer incorporated into a hardware structure or to a general-purpose computer, for example.

As shown in FIG. 3, users may be supplied with the software program in the recording medium separate from the apparatus. As shown in FIG. 3, the recording media include package media including a magnetic disk 64 (such a floppy Disk®), an optical disk 65 (such as a compact disk read-only memory (CD-ROM), and a digital versatile disk (DVD)), a magneto-optic disk 66 (such as Mini-Disk (MD®)), and a semiconductor memory 67.

The process steps discussed in this specification are sequentially performed in the time series order as stated. Alternatively, the steps may be performed in parallel or separately.

In this specification, the system refers to a system composed of a plurality of apparatuses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing apparatus, comprising:
    acquisition means for acquiring first information to be played back, and second information relating to a breakpoint candidate of the first information;
    display control means for controlling the playback of the first information; and
    display speed control means for controlling a playback speed of the first information,
    wherein the display speed control means is for controlling the playback speed of the first information based on the second information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed;
    wherein, in response to data indicating erasure of the breakpoint candidate during playback of the first information within the predetermined period, the display speed control means controls the playback speed of the first information to switch from the relatively low speed to the relatively high speed.

2. The information processing apparatus according to claim 1, wherein
    the first information comprises at least moving image data, and
    the second information relates to the breakpoint candidate set in response to the detection of a scene change in the moving image data.

3. The information processing apparatus according to claim 1, further comprising operation input means for receiving an operational input entered by a user, wherein the display speed control means controls the playback speed of the first information in response to the operational input entered by the user.

4. The information processing apparatus according to claim 1, further comprising:
    storage means for storing the second information acquired by the acquisition means;
    operational input means for receiving an operational input entered by a user;
    update control means for controlling the updating of the second information stored in the storage means to form updated second information based on the operational input for setting the breakpoint if the operational input for setting the breakpoint is entered via the operational input means; and
    record control means for controlling the recording of third information produced by editing the first information based on the updated second information.

5. The information processing apparatus according to claim 4, further comprising generating means for generating fourth information by binding first text data entered via the operational input means to information of the breakpoint of the updated second information.

6. The information processing apparatus according to claim 5, further comprising playback control means for controlling a playback start position of the first information based on time information corresponding to the first text data that is extracted from the fourth information matching second text data entered via the operational input means by the user, wherein the time information of the breakpoint is bound to the fourth information in addition to the first text data and the information of the breakpoint.

7. The information processing apparatus according to claim 6, wherein
    the generating means sorts the first text data contained in the fourth information into a plurality of groups in response to an operational input entered via the operational input means by the user,
    the display control means controls the displaying of a list of the first text data contained in a predetermined one of the plurality of groups selected by the user, and
    the playback control means controls the playback start position of the first information based on the time information corresponding to the first text data selected by the user as a result of the user's referencing the displayed list of the first text data.

8. The information processing apparatus according to claim 6, wherein
    the display control means further controls the displaying of a list of information of a plurality of first text data if the plurality of first text data contained in the fourth information matching the second text data entered via the operational input means by the user are extracted, and
    the playback control means controls the playback start position of the first information based on the time information corresponding to the first text data selected by the user as a result of the user's referencing the displayed list of the first text data.

9. A method for controlling the playback of information at an information processing apparatus including a processor, the method comprising:
    acquiring by the processor first information to be played back, and second information relating to a breakpoint candidate of the first information; and
    controlling by the processor a playback speed of the first information based on the second information,
    wherein the step of controlling the playback speed includes controlling the playback of the first information based on the second information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed, except that based on an indication of erasure of the breakpoint candidate during playback of the first information within the predetermined period, the playback speed of the first information is controlled to switch from the relatively low speed to the relatively high speed.

10. A recording medium recorded with a computer program for causing a computer to execute a method of controlling the playback of information, the method comprising:
    acquiring first information to be played back, and second information relating to a breakpoint candidate of the first information; and controlling a playback speed of the first information,
wherein the step of controlling the playback speed includes controlling the playback of the first information based on the second information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed, except that based on an indication of erasure of the breakpoint candidate during playback of the first information within the predetermined period, the playback speed of the first information is controlled to switch from the relatively low speed to the relatively high speed.

11. An information processing apparatus, comprising:
acquisition means for acquiring first information to be recorded;
determining means for determining a breakpoint candidate of the first information;
generating means for generating second information containing information relating to the breakpoint candidate determined by the determining means;
recording means for recording the first information and the second information with the first information and the second information bound to each other;
display speed control means for controlling a playback speed of the first information,
wherein the display speed control means is for controlling the playback speed of the first information based on the second information so that the first information is played back at a relatively low speed within a predetermined period of the first information in the vicinity of the breakpoint candidate, is played back at an intermediate speed within a period of the first information between the predetermined period of the first information and the remaining period of the first information and is played back at a relatively high speed within the remaining period of the first information, wherein the intermediate speed is between the relatively low speed and the relatively high speed, and
wherein, in response to data indicating erasure of the breakpoint candidate during playback of the first information within the predetermined period, the display speed control means controls the playback speed of the first information to switch from the relatively low speed to the relatively high speed.

12. The information processing apparatus according to claim 11, wherein
the first information comprises at least moving image data, and
the determining means determines the breakpoint candidate by detecting a scene change of the moving image data.

13. The information processing apparatus according to claim 11, further comprising:
display control means for controlling the playback of the recorded first information.

14. A method for controlling the recording of information at an information processing apparatus including a processor, the method comprising:
acquiring by the processor first information to be recorded;
detecting by the processor information corresponding to a breakpoint candidate of the first information;
generating by the processor second information based on the information corresponding to the breakpoint candidate; and
controlling by the processor the recording of the first information and the second information so that the first information and the second information are bound to each other;
controlling by the processor a playback speed of the first information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed, except that based on an indication of erasure of the breakpoint candidate during playback of the first information within the predetermined period, the playback speed of the first information is controlled to switch from the relatively low speed to the relatively high speed.

15. A recording medium recorded with a computer program for causing a computer to execute a method of controlling the recording of information, the method comprising:
acquiring first information to be recorded;
detecting information corresponding to a breakpoint candidate of the first information;
generating second information based on the information corresponding to the breakpoint candidate;
controlling the recording of the first information and the second information so that the first information and the second information are bound to each other; and
controlling a playback speed of the first information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed, except that based on an indication of erasure of the breakpoint candidate during playback of the first information within the predetermined period, the playback speed of the first information is controlled to switch from the relatively low speed to the relatively high speed.

16. An information processing apparatus, comprising:
an acquisition unit operable to acquire first information to be played back, and second information relating to a breakpoint candidate of the first information;
a display control unit operable to control the playback of the first information; and
a display speed control unit operable to control a playback speed of the first information based on the second information,
wherein the display speed control unit is operable to control the playback speed of the first information based on the second information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed;

wherein, in response to data indicating erasure of the breakpoint candidate during playback of the first information within the predetermined period, the display speed control unit controls the playback speed of the first information to switch from the relatively low speed to the relatively high speed.

17. An information processing apparatus, comprising:

an acquisition unit operable to acquire first information to be recorded;

a determining unit operable to determine a breakpoint candidate of the first information;

a generating unit operable to generate second information containing information relating to the breakpoint candidate determined by the determining unit;

a recording unit operable to record the first information and the second information with the first information and the second information bound to each other; and a display speed control unit operable to control a playback speed of the first information, wherein the display speed control unit is operable to control the playback speed of the first information based on the second information so that the first information is played back at a relatively low speed within a predetermined period of the first information in the vicinity of the breakpoint candidate, is played back at an intermediate speed within a period of the first information between the predetermined period of the first information and a remaining period of the first information and is played back at a relatively high speed within the remaining period of the first information, wherein the intermediate speed is between the relatively low speed and the relatively high speed, wherein, in response to data indicating erasure of the breakpoint candidate during playback of the first information within the predetermined period, the display speed control unit controls the playback speed of the first information to switch from the relatively low speed to the relatively high speed.

18. An information processing apparatus, comprising:

acquisition means for acquiring first information to be played back, and second information relating to a breakpoint candidate of the first information;

display control means for controlling the playback of the first information; and display speed control means for controlling a playback speed of the first information, wherein the display speed control means controls the playback speed of the first information based on the second information so that the first information 1) is playback at an intermediate speed within a predetermined period of the first information in the vicinity of the breakpoint candidate, 2) is playback at a relatively low speed within a period of the first information subsequent to the predetermined period, and 3) in response to data indicating erasure of the breakpoint candidate during playback of the first information during the period subsequent to the predetermined period, is played back at a relatively high speed within a remaining period of the first information, the intermediate speed being between the relatively low speed and the relatively high speed.

* * * * *